US011887761B2

United States Patent
(12) United States Patent
Kumaoka et al.

(10) Patent No.: US 11,887,761 B2
(45) Date of Patent: Jan. 30, 2024

(54) SOFT MAGNETIC ALLOY AND MAGNETIC COMPONENT

(71) Applicant: TDK CORPORATION, Tokyo (JP)

(72) Inventors: Hironobu Kumaoka, Tokyo (JP); Kazuhiro Yoshidome, Tokyo (JP); Hiroyuki Matsumoto, Tokyo (JP); Akito Hasegawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/672,373

(22) Filed: Feb. 15, 2022

(65) Prior Publication Data

US 2022/0319748 A1 Oct. 6, 2022

(30) Foreign Application Priority Data

Mar. 31, 2021 (JP) ................................ 2021-061027

(51) Int. Cl.
*H01F 1/153* (2006.01)
*C22C 45/02* (2006.01)
*C22C 45/04* (2006.01)

(52) U.S. Cl.
CPC ......... *H01F 1/15308* (2013.01); *C22C 45/02* (2013.01); *C22C 45/04* (2013.01); *H01F 1/15333* (2013.01); *C22C 2202/02* (2013.01)

(58) Field of Classification Search
None
See application file for complete search history.

(56) References Cited

U.S. PATENT DOCUMENTS

2007/0175545 A1 8/2007 Urata et al.
2017/0088933 A1* 3/2017 Launey .................. C22C 19/05
2017/0294254 A1 10/2017 Urata et al.
2017/0323712 A1* 11/2017 Yoshizawa ............... C21D 9/52
2019/0237229 A1* 8/2019 Yoshidome ............ C21D 6/008
2021/0159001 A1* 5/2021 Tsukahara ........... H01F 1/15333

FOREIGN PATENT DOCUMENTS

JP 2007-231415 A 9/2007
JP 2009-293099 A 12/2009
JP 2014-167139 A 9/2014

* cited by examiner

*Primary Examiner* — Brian D Walck
(74) *Attorney, Agent, or Firm* — Oliff PLC

(57) ABSTRACT

A soft magnetic alloy including an internal area having a soft magnetic type alloy composition including Fe and P (phosphorous), and a P concentrated area existing closer to a surface side than the internal area and having a higher P concentration than in the internal area.

11 Claims, 11 Drawing Sheets

SOFT MAGNETIC ALLOY AND MAGNETIC COMPONENT

TECHNICAL FIELD

The present disclosure relates to a soft magnetic alloy, and a magnetic component using the soft magnetic alloy.

BACKGROUND

As a magnetic material used for various magnetic components such as an inductor and the like, soft magnetic alloys shown in Patent Documents 1 to 3 are known. These soft magnetic alloys have a higher saturation magnetic flux density Bs than a ferrite material, and exhibits good soft magnetic properties. Note that, occasionally, corrosion such as rust and the like formed to a soft magnetic alloy, thus an improved corrosion resistant of the soft magnetic alloy was demanded.

[Patent Document 1] Patent Application Laid Open No. 2009-293099

[Patent Document 2] Patent Application Laid Open No. 2007-231415

[Patent Document 3] Patent Application Laid Open No. 2014-167139

SUMMARY

The present disclosure is achieved in view of such circumstances, and the object is to provide a soft magnetic alloy having a high corrosion resistance, and a magnetic component using the soft magnetic alloy.

In order to achieve the above-mentioned object, the soft magnetic alloy according to the present disclosure includes an internal area having a soft magnetic type alloy composition including Fe and P (phosphorous), and a P concentrated area existing closer to a surface side than the internal area and having a higher P concentration than in the internal area.

As a result of keen study by the present inventors, the soft magnetic alloy satisfying the above-described characteristics can suppress rust formation when it is immersed in water, thus a corrosion resistance is improved.

Preferably, the P concentrated area and the internal area may include common elements which are included in both of the P concentrated area and the internal area, and a total amount of the common elements included in the P concentrated area may be 50 mol % or more.

Preferably, the internal area may include Co, and a concentrated area of Co may exist closer to the surface side than the internal area, and also the concentrated area of Co may at least partially overlap with the P concentrated area. Further, preferably the concentrated area of Co may include a metal phase. A Co concentration degree in the concentrated area of Co may preferably be larger than 1.2.

Also, a P concentration degree of the P concentrated area may preferably be 1.5 or more, and more preferably 2.0 or more.

Preferably, an amorphous degree of the soft magnetic alloy may be 85% or more.

Preferably, the soft magnetic alloy may be a ribbon form, or may be a powder form.

The use of the soft magnetic alloy of the present disclosure is not particularly limited, and for example, it can be used for various coil components such as an inductor and the like, a filter, and various magnetic components such as an antenna, and the like. Among the above-mentioned uses, the soft magnetic alloy of the present disclosure is suitable as a material for a magnetic core in the coil component and the like.

DETAILED DESCRIPTION

Hereinafter, the present disclosure is described in further detail based on embodiments shown in the figures.

A soft magnetic alloy 1 of the present embodiment can be a ribbon form, a powder form, a block form, and the like; and a shape of the soft magnetic alloy 1 is not particularly limited. Also, a size of the soft magnetic alloy 1 is not particularly limited. For example, when the soft magnetic alloy 1 is a ribbon form, a thickness of the ribbon may be within a range of 15 μm to 100 μm. When the soft magnetic alloy 1 is a powder form, an average particle size of the soft magnetic alloy powder can be within a range of 0.5 μm to 150 μm, and preferably within a range of 0.5 μm to 25 μm.

Note that, the above-mentioned average particle size can be measured by using various particle size analyzing method such as a laser diffraction method and the like; and preferably, the average particle size may be measured by using a particle image analyzer Morphologi G3 (made by Malvern Panalytical Ltd). A Morphologi G3 is a device which disperses the soft magnetic alloy powder using air, and a projected area of the individual particle constituting the powder is measured, then a particle size distribution of a circle equivalent diameter from the projected area is obtained. Then, from the obtained particle size distribution, the average particle size may be a particle size where a volume-based or number-based cumulative relative frequency is 50%. Note that, when the soft magnetic alloy 1 is included in the magnetic core, the average particle size of the soft magnetic alloy 1 (powder) is obtained by measuring the circle equivalent diameter of the particle included in the cross section by observing the cross section using an electron microscope (SEM, STEM, and the like).

Figure 1A:
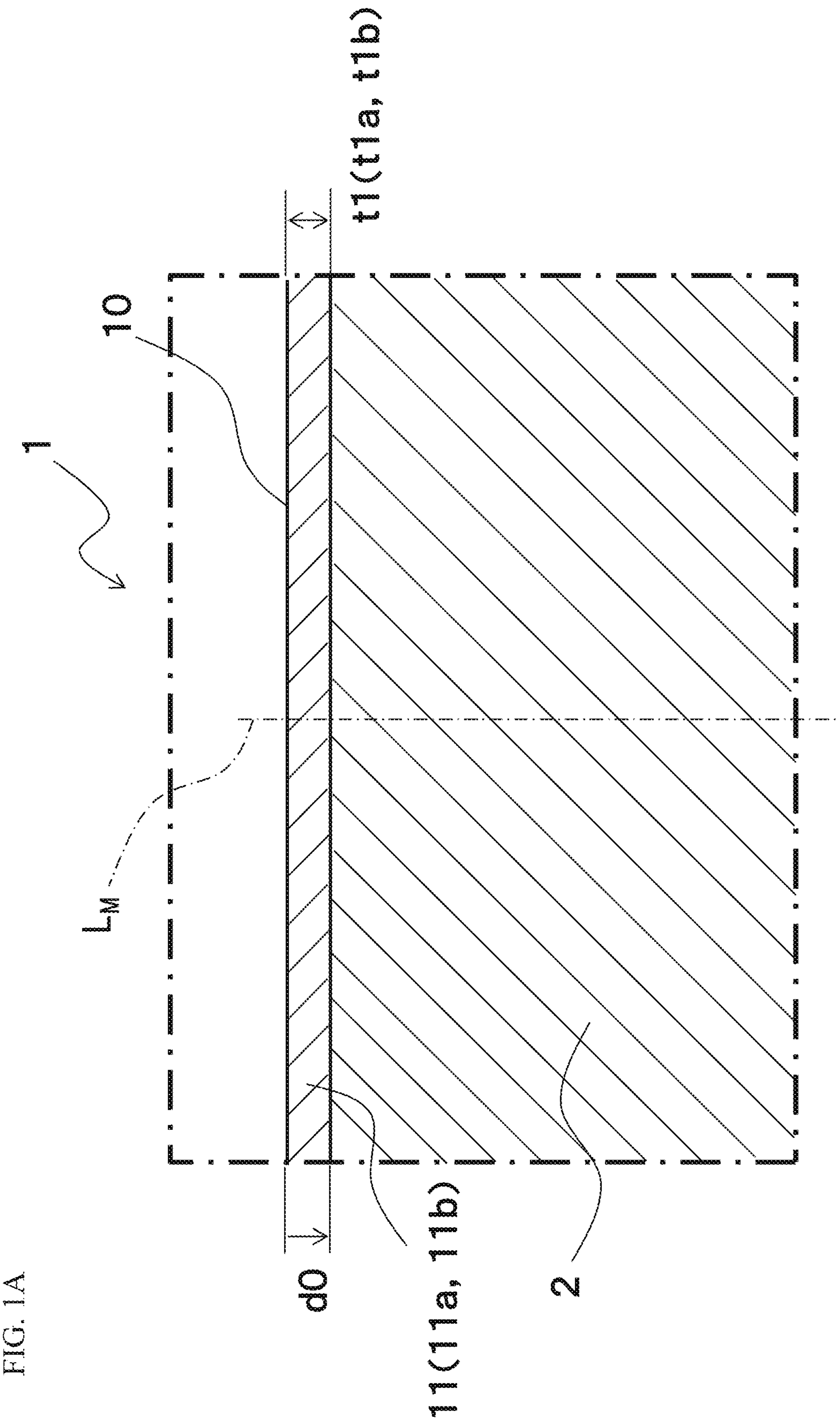
FIG. 1A is an enlarged cross section of an essential part of a soft magnetic alloy 1 according to an embodiment of the present disclosure.

FIG. 1A is a cross section which is an enlarged image near a surface of the soft magnetic alloy 1. As shown in FIG. 1A, the soft magnetic alloy 1 includes an internal area 2 and a concentrated area 11 positioned closer to the surface side of the soft magnetic alloy 1 than the internal area. Note that, in the present embodiment, "an inner side" means a side closer to a center of the soft magnetic alloy 1, "a surface side" or "an outer side" means a side away from the center of the soft magnetic alloy 1.

(Internal Area 2)

The internal area 2 is a main part of the soft magnetic alloy 1 which occupies at least 90 vol % of a volume of the soft magnetic alloy 1. Thus, an average composition of the soft magnetic alloy 1 can be considered as a composition of the internal area 2; and a crystal structure of the soft magnetic alloy 1 can be considered as a crystal structure of the internal area 2. Note that, a volume ratio of the above-mentioned internal area 2 is interchangeable with an area ratio, and the internal area 2 occupies at least 90% of a cross section of the soft magnetic alloy 1.

The internal area 2 (that is the soft magnetic alloy 1) is constituted by a soft magnetic type alloy composition including Fe and P (phosphorous). An amount of Pin the internal area 2 is preferably within a range of 0.1 at % to 10 at %, and more preferably within a range of 2.0 at % to 7.0 at %. Further, in the internal area 2, Co is preferably included in addition to Fe and P.

A specific type of alloy of the internal area 2 is not particularly limited, and for example a crystal type soft magnetic alloy including P such as a Fe—Co based alloy, a Fe—Co—V based alloy, a Fe—Co—Si based alloy, a Fe—Co—Si—Al based alloy, a Fe—Co—Si—Cr based alloy, and the like may be mentioned. Also, from the point of lowering a coercivity, the internal area 2 is preferably constituted by an amorphous alloy composition or a nanocrystal alloy composition. As an amorphous or nanocrystal soft magnetic alloy, a Fe—Co—P—C based alloy, a Fe—Co—B—P based alloy, a Fe—Co—B—Si—P based alloy, and the like may be mentioned. More specifically, the internal area 2 is preferably constituted by an alloy composition satisfying a compositional formula of $((Fe_{(1-(\alpha+\beta)}Co_{\alpha}Ni_{\beta})_{1-\gamma}X1_{\gamma})_{(1-(a+b+c+d+e))}B_aP_bSi_cC_dCre$ By constituting the internal area 2 with the alloy composition satisfying the above-compositional formula, a crystal structure made of amorphous, heteroamorphous, or nanocrystals tends to be obtained easily.

In the above-mentioned compositional formula, "B" is boron, "P" is phosphorous, "C" is carbon, and X1 is at least one selected from Ti, Zr, Hf, Nb, Ta, Mo, W, Al, Ga, Ag, Zn, S, Ca, Mg, V, Sn, As, Sb, Bi, N, O, Au, Cu, rare earth elements, and platinum group elements. The rare earth elements include Sc, Y, and lanthanoids; and the platinum group elements include Ru, Rh, Pd, Os, Ir, and Pt. Also, α, β, γ, a, b, c, d, and e represent atomic ratios, and these atomic ratios preferably satisfy the following relations.

A Co amount (α) with respect to Fe may be within a range of $0\leq\alpha\leq0.700$, may be within a range of $0.005\leq\alpha\leq0.600$, may be within a range of $0.030\leq\alpha\leq0.600$, or may be within a range of $0.050\leq\alpha\leq0.600$. When the Co amount (α) is within the above-mentioned range, a saturation magnetic flux density (Bs) and the corrosion resistance improve. From the point of improving Bs, the Co amount (α) may preferably be within a range of $0.050\leq\alpha\leq0.500$. As the Co amount (α) increases, the corrosion resistance tends to improve; and when the Co amount (α) is too large, Bs tends to decrease easily.

Also, a Ni amount (β) with respect to Fe may be within a range of $0\leq\beta\leq0.200$. That is, Ni may not be included, and the Ni amount (β) may be within a range of $0.005\leq\beta\leq0.200$. From the point of improving Bs, the Ni amount (β) may be within a range of $0\leq\beta\leq0.050$, may be within a of $0.001\leq\beta\leq0.050$, or may be within a range of $0.005\leq\beta\leq0.010$. As the Ni amount (β) increases, the corrosion resistance tends to improve, and when the Ni amount (β) is too large, Bs decreases.

X1 may be included as impurities, or may be added intentionally. A X1 amount (γ) may be within a range of $0\leq\gamma<0.030$. That is, less than 3.0% of a total amount of Fe, Co, and Ni may be substituted by X1.

Further, when a sum of atomic ratios of elements constituting the soft magnetic alloy is 1, an atomic ratio $(1-(a+b+c+d+e))$ of a total amount of Fe, Co, Ni, and X1 is preferably within a range of $0.720\leq(1-(a+b+c+d+e))\leq0.950$, and more preferably is within a range of $0.780\leq(1-(a+b+c+d+e))\leq0.890$. When the above-mentioned relation is satisfied, Bs tends to improve easily. Also, when $0.720\leq(1-(a+b+c+d+e))\leq0.890$ is satisfied, an amorphous soft magnetic alloy is easily obtained.

The atomic ratio of B is represented by "a", and "a" is preferably within a range of $0\leq a\leq0.200$; and from the point of improving Bs, "a" is more preferably within a range of $0\leq a\leq0.150$.

The atomic ratio of P is represented by "b", and "b" is preferably within a range of $0.001\leq b\leq0.100$. From the point of improving both Bs and the corrosion resistance, "b" is preferably within a range of $0.005\leq b\leq0.080$, more preferably within a range of $0.005\leq b\leq0.050$.

The atomic ratio of Si is represented by "c", and "c" is preferably within a range of $0\leq c\leq0.150$. That is, Si may not be included; and from the point of improving both Bs and the corrosion resistance, "c" is more preferably within a range of $0.001\leq c\leq0.070$.

The atomic ratio of C is represented by "d", and "d" is preferably within a range of $0\leq d\leq0.050$. That is, C may not be included; and from the point of improving both Bs and the corrosion resistance, "d" is more preferably within a range of $0\leq d\leq0.020$.

The atomic ratio of Cr is represented by "e", and "e" is preferably within a range of $0\leq e\leq0.050$. That is, from the point of improving Bs, Cr may not be included; and from the point of improving both Bs and the corrosion resistance, "e" is more preferably within a range of $0.001\leq e\leq0.020$.

The composition of the above-mentioned internal area 2 (that is, the composition of the soft magnetic alloy 1) can be analyzed, for example, by using Inductively Coupled Plasma (ICP). Here, when it is difficult to determine an oxygen amount by using ICP, an impulse heat melting extraction method can be used. Also, if it is difficult to determine a carbon amount and a sulfur amount by using ICP, an infrared absorption method can be used.

Also, other than ICP, a compositional analysis may be carried out by EDX (Energy Dispersive X-ray Spectroscopy) or EPMA (Energy Probe Microanalyzer) using an electron microscope. For example, regarding the soft magnetic alloy 1 included in a magnetic core which includes a resin component, a compositional analysis using ICP may be difficult in some cases. In such case, the compositional analysis may be carried out using EDX or EPMA. Also, if a detailed compositional analysis is difficult by any of the above-mentioned methods, the detailed compositional analysis may be performed using 3DAP (three dimensional atom probe). In case of using 3DAP, the influence of the resin component, a surface oxidation, and the like are excluded from the area of analysis, then the composition of the soft magnetic alloy 1, that is the composition of the internal area 2, can be determined. This is because when 3DAP is used, a small area (for example, an area of φ20 nm×100 nm) is set in the soft magnetic alloy 1 to determine an average composition.

Figure 3A:
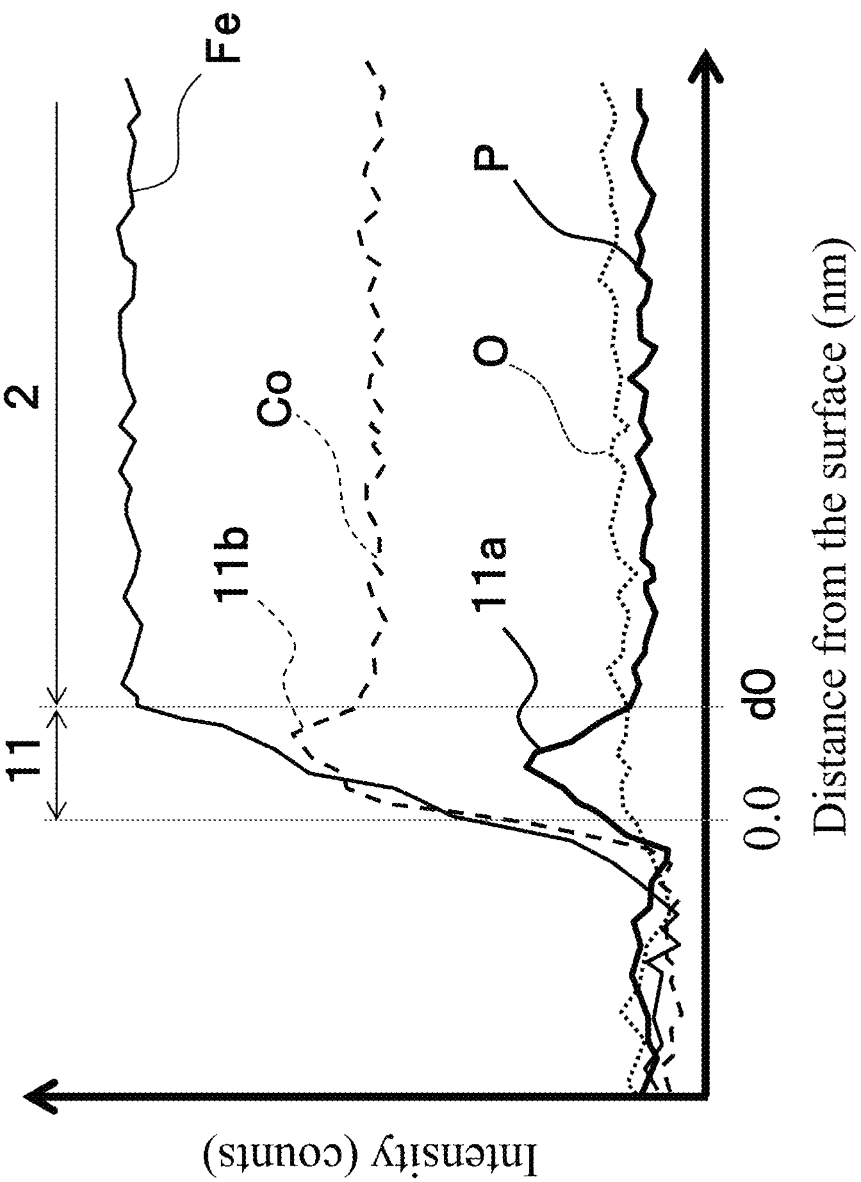
FIG. 3A is an example of a graph obtained by performing a line analysis using EDX along a measurement line $L_M$ shown in FIG. 1A.

Note that, in case a line analysis of a cross section near the surface side of the soft magnetic alloy 1 is carried out by using EDX or EELS (Electron Energy Loss Spectroscopy), the internal area 2 can be recognized as an area having stable concentrations of Fe and Co (see FIG. 3A). Also, for example, the average composition obtained by performing a mapping analysis to the internal area 2 can be considered as the composition of the soft magnetic alloy 1. In such case, the mapping analysis is performed using EDX or EELS; and an area to be measured is an area which is 100 nm or more away in a depth direction from the surface of the soft magnetic alloy 1 (corresponds to the internal area 2), and an area of measurement may be about 256 nm×256 nm or so.

A crystal structure of the internal area 2 (that is, a crystal structure of the soft magnetic alloy 1) can be a crystalline structure, a nanocrystal structure, or an amorphous structure; and preferably the crystal structure of the internal area 2 may be an amorphous structure. In other words, an amorphous degree X of the internal area 2 (that is, an amorphous degree X of the soft magnetic alloy 1) is preferably 85% or more. The crystal structure having the amorphous degree X of 85% or more is a structure which is mostly made of amorphous, or heteroamorphous. The structure made of heteroamorphous is a structure in which crystals slightly exist inside amorphous. That is, in the present embodiment, "a crystal structure is amorphous" means that a crystal structure has the amorphous degree X of 85% or more; and crystals may be included as long as the amorphous degree X satisfies the above-mentioned range.

Note that, in case the structure is heteroamorphous, the average crystal particle size of the crystals existing in amorphous structure may preferably be within a range of 0.1 nm or more and 10 nm or less. Also, in the present embodiment, "nanocrystal" refers to a structure in which the amorphous degree X is less than 85% and the average crystal particle size is 100 nm or less (preferably, 3 nm to 50 nm). Further, "crystalline" refers to a crystal structure in which the amorphous degree X is less than 85% and the average crystal particle size is larger than 100 nm.

Figure 2A:
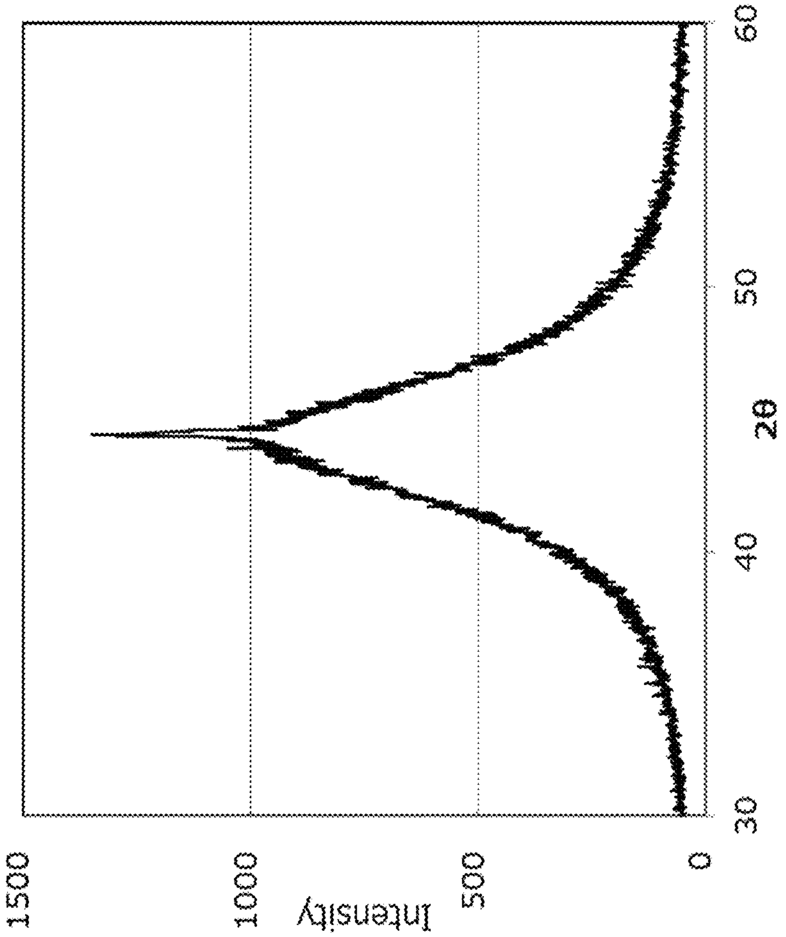
FIG. 2A is an example of a chart obtained from an X-ray crystallography.

The amorphous degree X can be measured by X-ray crystallography using XRD. Specifically, 2θ/θ measurement is performed using XRD to the soft magnetic alloy 1 according to the present embodiment, and a chart shown in FIG. 2A is obtained. Here, a measurement range of a diffraction angle 2θ may preferably be set to a range in which amorphous-derived halos can be confirmed, for example within a range of 2θ=30° to 60°.

Figure 2B:
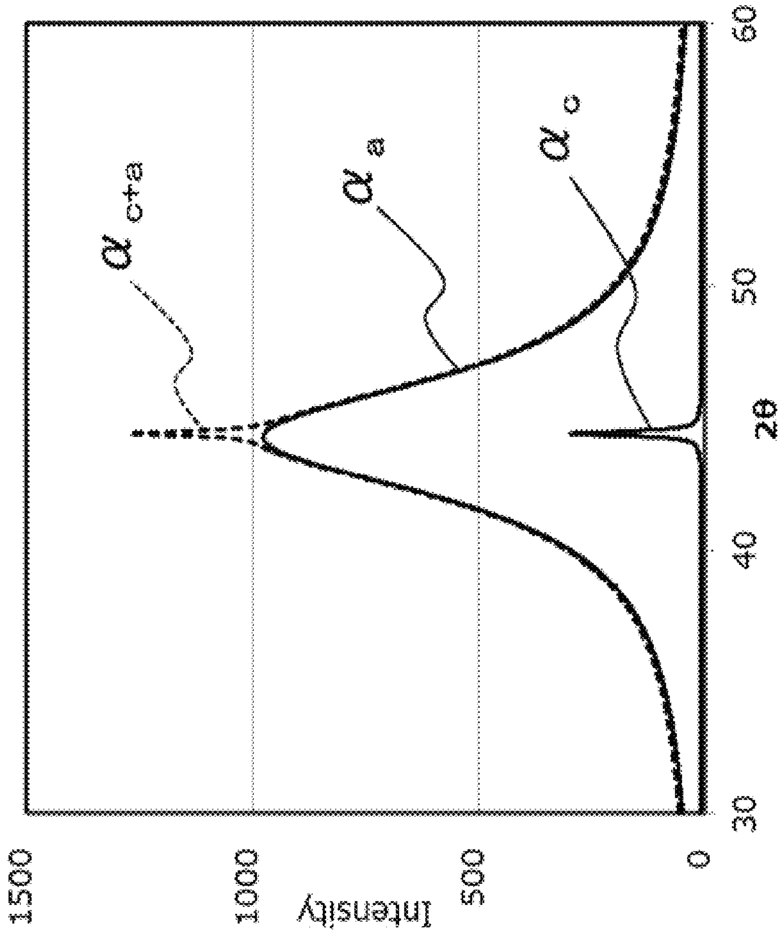
FIG. 2B is an example of a pattern obtained by profile fitting the chart shown in FIG. 2A.

Next, the chart shown in FIG. 2A is profile-fitted using a Lorentz function represented by the following equation (2). In this profile fitting, a difference between the integrated intensities actually measured by using XRD and the integrated intensities calculated using the Lorentz function is preferably within 1%. As a result of this profile fitting, as shown in FIG. 2B, a crystal component pattern $\alpha_c$ which indicates a crystal scattering integrated intensity Ic, an amorphous component pattern $\alpha_a$ which indicates an amorphous scattering integrated intensity Ia, and a pattern $\alpha_{c+a}$ which is a combination of these two are obtained. Then, the crystal scattering integrated intensity Ic and the amorphous scattering integrated intensity Ia obtained here are placed in the below equation (1), thereby the amorphous degree X is obtained.

$$X=100-(Ic/(Ic+Ia)\times 100) \quad \text{Equation (1)}$$

Ic: Crystal scattering integrated intensity
Ia: Amorphous scattering integrated intensity

[Formula 1]

$$f(x) = \frac{h}{1+\frac{(x-u)^2}{w^2}} + b \quad \text{(Equation 2)}$$

h: Peak height
u: Peak position
w: Half bandwidth
b: Background height

Note that, a method of measuring the amorphous degree X is not limited to a method using the above-mentioned XRD, and the amorphous degree X may be measured by using EBSD (Electron BackScatter Diffraction) or electron diffraction.

(Concentrated Area 11)

The concentrated area 11 and the internal area 2 include common constituting elements such as Fe, P, Co, and the like which are elements included in both the concentrated area 11 and the internal area 2. The total amount of the common constituting elements included in the concentrated area 11 which are also included in the internal area 2 is 50 mol % or more, and preferably 80 mol % or more. That is, the concentrated area 11 in the present embodiment is not a coating layer which is formed by a phosphate treatment, but rather the concentrated area 11 is a compositional phase made of Fe, P, Co, and the like, and the concentrated area 11 is preferably an amorphous phase continuous from the internal area 2.

As mentioned in above, the concentrated area 11 includes the common elements which are also included in the internal area 2, and the concentrated area 11 and the internal area 2 have a different compositional ratio. Specifically, in the concentrated area 11, P is more concentrated than in the internal area 2. In other words, the concentrated area 11 includes a P concentrated area 11*a* having a higher P concentration than in the internal area 2, and this P concentrated area 11*a* at least partially covers a periphery of the internal area 2. In the cross section of the soft magnetic alloy 1, a coverage of the concentrated area 11 (that is, the P concentrated area 11*a*) with respect to the internal area 2 is not particularly limited, and for example it can be 50% or more, and more preferably it can be 80% or more.

Also, in the concentrated area 11, Co is preferably concentrated compared to the internal area 2, and preferably a Co concentrated area 11*b* exists in the concentrated area 11. This Co concentrated area 11*b* overlaps with the P concentrated area 11*a* in a depth direction (thickness direction) of the soft magnetic alloy 1 which is from the surface side towards the inner side. The Co concentrated area 11*b* and the P concentrated area 11*a* may partially overlap or completely overlap in a depth direction. In case the Co concentrated area 11*b* and the P concentrated area 11*a* partially overlap, preferably the P concentrated area 11*a* is positioned at the surface side of the concentrated area 11 than the Co concentrated area 11*b*.

The concentrated area 11 having the above-mentioned characteristics can be analyzed using EDX or EELS (Electron Energy Loss Spectroscopy), and particularly the concentrated area 11 is analyzed using EELS which has a high spatial resolution.

Figure 5A:
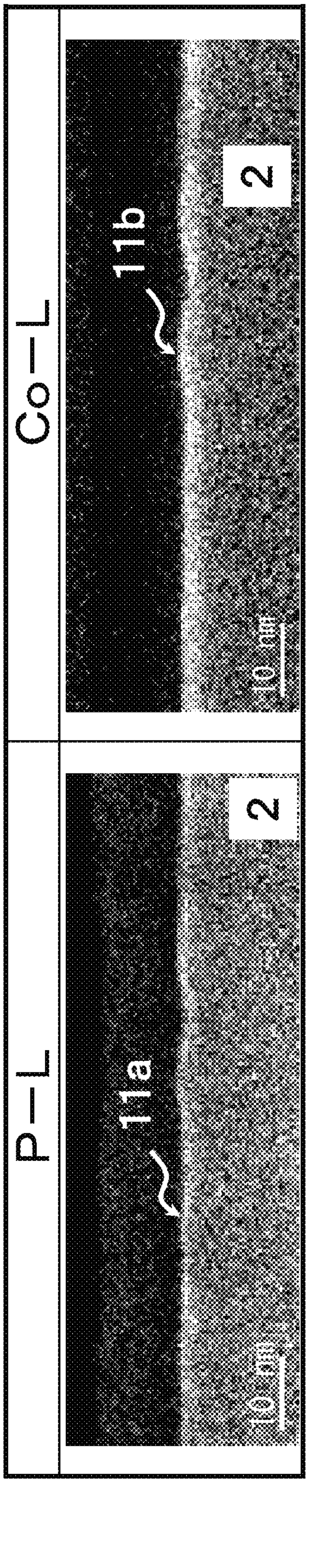
FIG. 5A is an example of an EELS image of the soft magnetic alloy 1 shown in FIG. 1A.

For example, the cross section of the surface area of the soft magnetic alloy 1 is observed using STEM (scanning transmission electron microscope) or TEM (transmission electron microscope), and at the same time a mapping analysis is performed using EDX or EELS, thereby the presence of the concentrated area 11 and the coverage thereof can be verified. The images (EELS images) shown in FIG. 5A are examples of a mapping analysis result using EELS. The two images shown in FIG. 5A are results measured from the same place; and the EELS image of the left side shows the P distribution, and the EELS image (Co-L) on the right side shows the Co distribution. In said EELS image, the internal area 2 can be recognized as an area where almost no shade of Co can be seen in a Co concentration distribution. Further, in the EELS image regarding P, at the edge of the internal area 2, the contrast becomes brighter which implicates that the P concentration is higher than in the internal area 2. This area with a high P concentration is the P concentrated area 11*a*.

Also, in the EELS image regarding Co, at the edge of the internal area 2, the contrast showing Co becomes brighter which implicates that the Co concentration is higher than in the internal area 2. This area with a high Co concentration is the Co concentrated area 11*b*. In FIG. 5A, it can be confirmed that the P concentrated area 11*a* and the Co concentrated area 11*b* exist by overlapping with each other.

An average thickness t1a of the P concentrated area 11*a* identified by this mapping analysis is preferably 0.3 nm or more. The upper limit of t1a is not particularly limited, and for example it can be 30 nm or less. When t1a is thickened within this preferable range, further enhanced corrosion resistance can be obtained. Note that, the average thickness t1a is preferably calculated by measuring the thickness of the P concentrated area 11 at least from 3 different points by changing the area of measurement.

An average thickness tb1 of the Co concentrated area 11*b* can be within the range same as the above-mentioned t1a; and t1a and t1b may satisfy the relation of t1a>t1b, or t1a≤t1b. Note that, the thickness t1 of the concentrated area 11 is a thickness of an area having a high detection intensity of P or/and Co; when the Co concentrated area 11*b* does not exist, then t1=t1a. Also, when the P concentrated area 11*a* and the Co concentrated area 11*b* are overlapped completely, then t1=t1a (in case of t1a>t1b) is satisfied, or t1=t1b (in case of t1a≤t1b) is satisfied.

As mentioned in above, the P concentrated area 11*a* and the Co concentrated area 11*b* may be extremely thin in some cases, thus in case of identifying the P concentrated area 11*a* and the Co concentrated area 11*b*, a line analysis is preferably used together with the mapping analysis. FIG. 3A is a schematic diagram showing an example of a line analysis result along a measurement line $L_M$ shown in FIG. 1A; and a vertical axis is a detection intensity of each element (that is, the intensity of characteristic X-ray), and a horizontal axis is a distance (depth) from the outermost surface 10. As shown in FIG. 3A, the line analysis results show a high peak of P concentration at the edge of the internal area 2 in which the concentrations of Fe and Co are stable. The area showing this peak of P is the P concentrated area 11*a*. In other words, a local maximum of the P concentration exists in the P concentrated area 11*a*, and due to the above-mentioned peak, the presence of the P concentrated area 11*a* can be confirmed. Note that, when the Co concentrated area 11*b* exists, the peak of Co is confirmed in a manner which overlaps with the peak of P.

Also, as mentioned in above, the concentrated area 11 is preferably a metal phase, and a phase state of the concentrated area 11 can be verified for example by a line analysis, a mapping analysis, or analysis using EELS of STEM or TEM. For example, when spectrums obtained by EELS are analyzed, ratios of oxides of Co and metal Co in the Co concentrated area 11*b* can be calculated. When a ratio of metal Co is larger than a ratio of oxides of Co, the Co concentrated area 11*b* is defined as a metal phase. Also, when oxide layers (a SB oxide layer 12, a Fe oxide layer 13, a coating layer 20, and the like which are described in below) exist outside of the concentrated area 11, an oxygen detection intensity in the concentrated area 11 tends to be lower than in the oxide layers in the mapping analysis result and a line analysis result. Due to such analysis, it can be confirmed that the concentrated area 11 is a metal phase.

Regarding the P concentrated area 11*a*, the concentration degree of P is expressed by an intensity ratio, and this intensity ratio is calculated from a line analysis using EDX or EELS. Specifically, a detection intensity of P in the internal area 2 is defined as $\mathbf{C2}_p$, a detection intensity of P in the P concentrated area 11*a* is defined as $\mathbf{C11}_p$, and a P intensity ratio (concentration degree) in the P concentrated area 11*a* is defined as $\mathbf{C11}_p/\mathbf{C2}_p$. This P intensity ratio is preferably 1.3 or more, more preferably 1.5 or more, and even more preferably 2.0 or more. The upper limit of the P concentration degree is not particularly limited, and for example, it can be 20 or less.

Also, in the present embodiment, the Co concentration degree in the Co concentrated area 11*b* is defined by a ratio ($\mathbf{C11}_{Co}/\mathbf{C2}_{Co}$) of a Co mole ratio in the Co concentrated area 11*b* ($\mathbf{C11}_{Co}$) with respect to a Co mole ratio in the internal area 2 ($\mathbf{C2}_{Co}$). The Co concentration degree is preferably larger than 1.02, and more preferably larger than 1.20. Note that, the upper limit of the Co concentration degree is not particularly limited, and for example it can be 20 or less. When the soft magnetic alloy constituted by the internal area 2 which does not have the concentrated area 11 is used as a standard alloy, the corrosion resistance of the soft magnetic alloy 1 of the present embodiment compared to said standard alloy tends to improve as the Co concentration degree increases.

$\mathbf{C2}_{Co}$ and $\mathbf{C11}_{Co}$ used for the calculation of the Co concentration degree are measured by carrying out a component analysis using EELS. Specifically, $\mathbf{C2}_{Co}$ is a mole ratio of Co with respect to a total of Fe and Co detected in the internal area 2, and $\mathbf{C2}_{Co}$ is calculated by analyzing the EELS spectrums. Similarly, $\mathbf{C11}_{Co}$ is a mole ratio of Co with respect to a total of Fe and Co detected in the Co concentrated area 11. That is, the mole ratio of Co in each area is represented by "Co/(Fe+Co)". In order to remove the influence from the impurities (elements which are mixed while making the measurement sample), (Fe+Co) is used as a denominator.

Note that, a resolution during said analysis is preferably set to 0.5 nm or less, and for measuring $\mathbf{C2}_{Co}$, preferably a point which is at a depth of 0.2 or deeper from the outermost surface 10 of the soft magnetic alloy 1 towards the inside is measured. Also, the above-mentioned measurement is performed to at least five observation fields, and the P concentration degree and the Co concentration degree are obtained as the average of the measurement results.

The soft magnetic alloy 1 has a characteristic surface structure (the concentrated area 11) which includes the P concentrated area 11*a* and the Co concentrated area 11*b*. Particularly, in the present embodiment, as shown in FIG. 1A and FIG. 3A, the P concentrated area 11*a* is positioned to the outermost surface side and constitutes an outermost surface 10 of the soft magnetic alloy 1. Note that, other surface structures may exist at the outer side of the P concentrated area 11*a*.

For example, as shown the soft magnetic alloy 1*a* of FIG. 1A, the SB oxide layer 12 including Si or/and B may be formed such that the SB oxide layer 12 covers the surface side of the P concentrated area 11*a*. This SB oxide layer 12 has a higher concentration of at least one element selected from Si and B than in the internal area 2; and either one of Si or B, or both of Si and B are concentrated in the SB oxide layer.

Figure 1B:
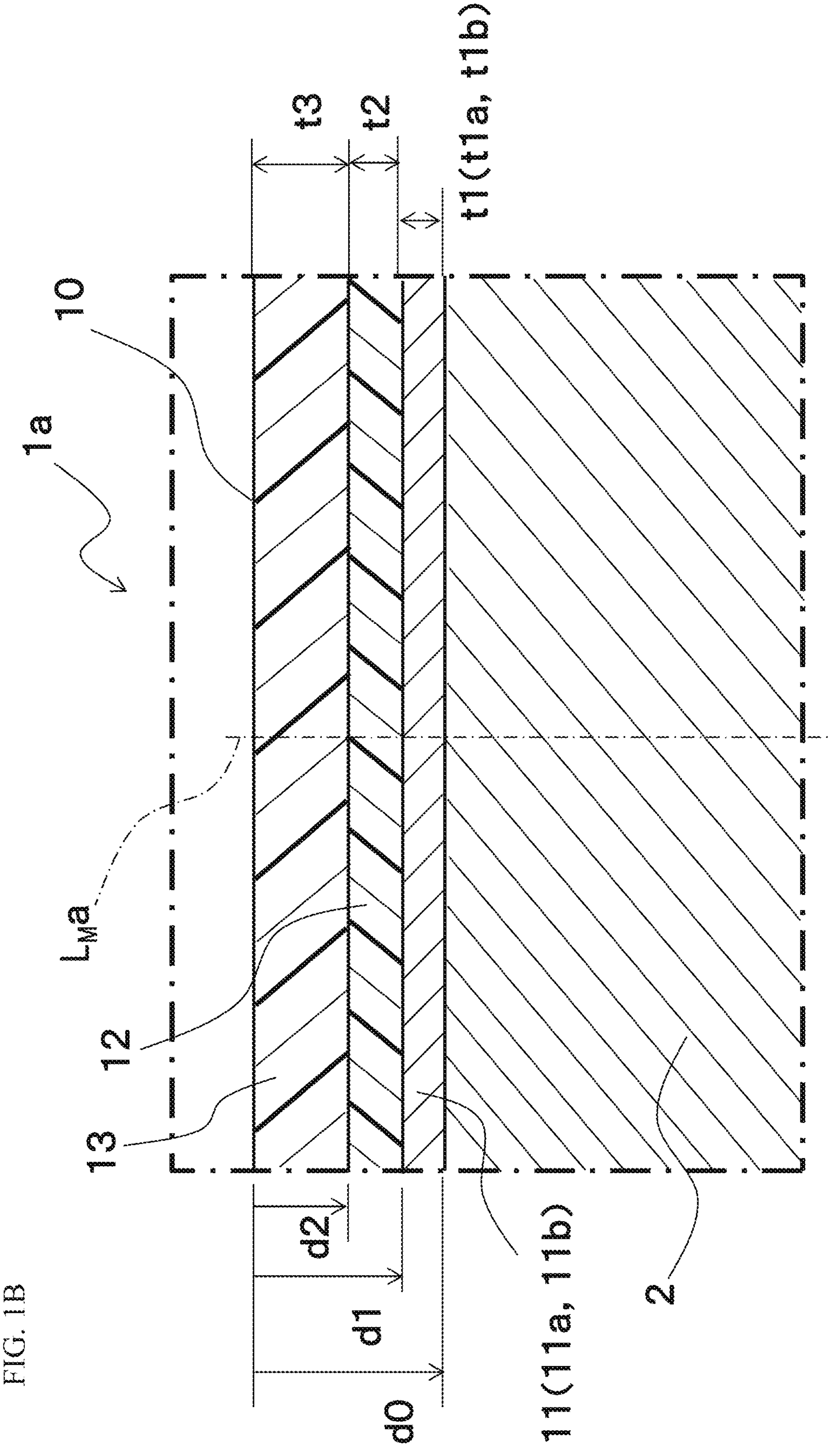
FIG. 1B is an example of an enlarged cross section of a soft magnetic alloy 1*a* according to an embodiment of the present disclosure.
Figure 5B:
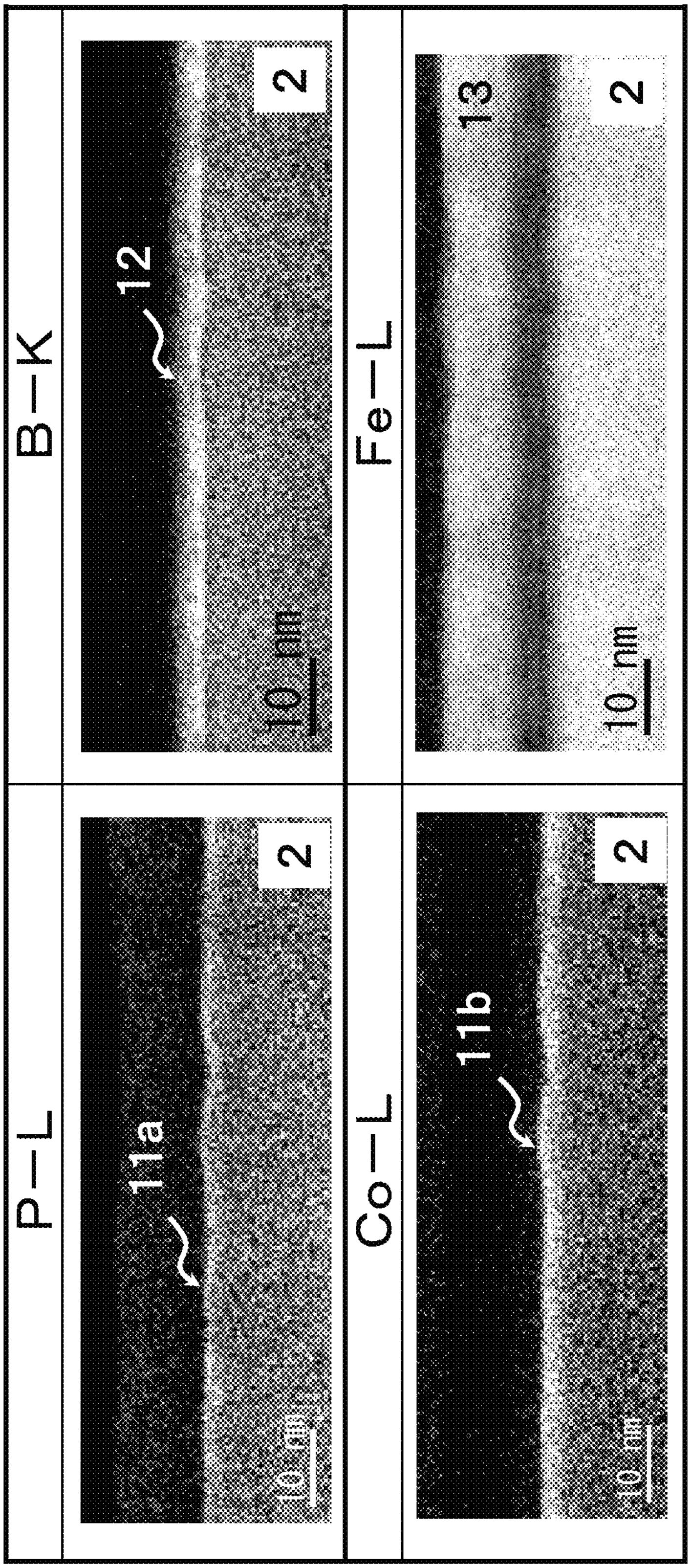
FIG. 5B is an example of an EELS image of the soft magnetic alloy 1*a* shown in FIG. 1B.

In fact, FIG. 5B is one example of EELS images of the soft magnetic alloy 1*a* shown in FIG. 1B, and the four EELS images shown in FIG. 5B are results measured from the same place. In the EELS image regarding to B (the upper right side image: B-K) of FIG. 5B, the surface side has a brighter contrast than at the concentrated area 11 in which P and Co are concentrated, which confirms that the B concentration at said area having a brighter contrast is higher than in the internal area 2 and the concentrated area 11. In case of FIG. 5B, this area having a high B concentration is the SB oxide layer 12.

In some case, when Si or/and B is included in the internal area 2, the SB oxide layer 12 may be formed during the process of forming the concentrated area 11, and preferably the SB oxide layer 12 is an amorphous oxide phase. Further, the average thickness t2 of the SB oxide layer 12 is preferably 0.5 nm or more. The upper limit of t2 is not particularly limited, and for example it may be 30 nm or less.

Also, at the outside of the P concentrated area 11*a*, the Fe oxide layer 13 including Fe may be formed. In some case, this Fe oxide layer 13 may form together with the concentrated area 11 while the concentrated area 11 is formed, and the Fe concentration in the Fe oxide layer 13 is higher than in the concentrated area 11 and the internal area 2. Note that, as shown in FIG. 1B, when the SB oxide layer 12 exists, the Fe oxide layer 13 is preferably positioned closer to the surface side than the SB oxide layer 12, and further preferably the crystallized area ratio of the Fe oxide layer 13 is higher than that of the SB oxide layer 12.

In fact, in the EELS image regarding Fe (the lower right image: Fe-L) shown in FIG. 5B, the surface side has a brighter contrast than at the SB oxide layer 12, and the area having a high Fe concentration can be confirmed at the outermost surface of the soft magnetic alloy 1*a*. In FIG. 5B, said area having a high Fe concentration is the Fe oxide layer 13, and it constitutes the outermost surface 10 of the soft magnetic alloy 1*a*. In the present embodiment, an average thickness t3 of the Fe oxide layer 13 is preferably 1 nm or more. The upper limit of t3 is not particularly limited, and for example it can be 50 nm or less.

Figure 3B:
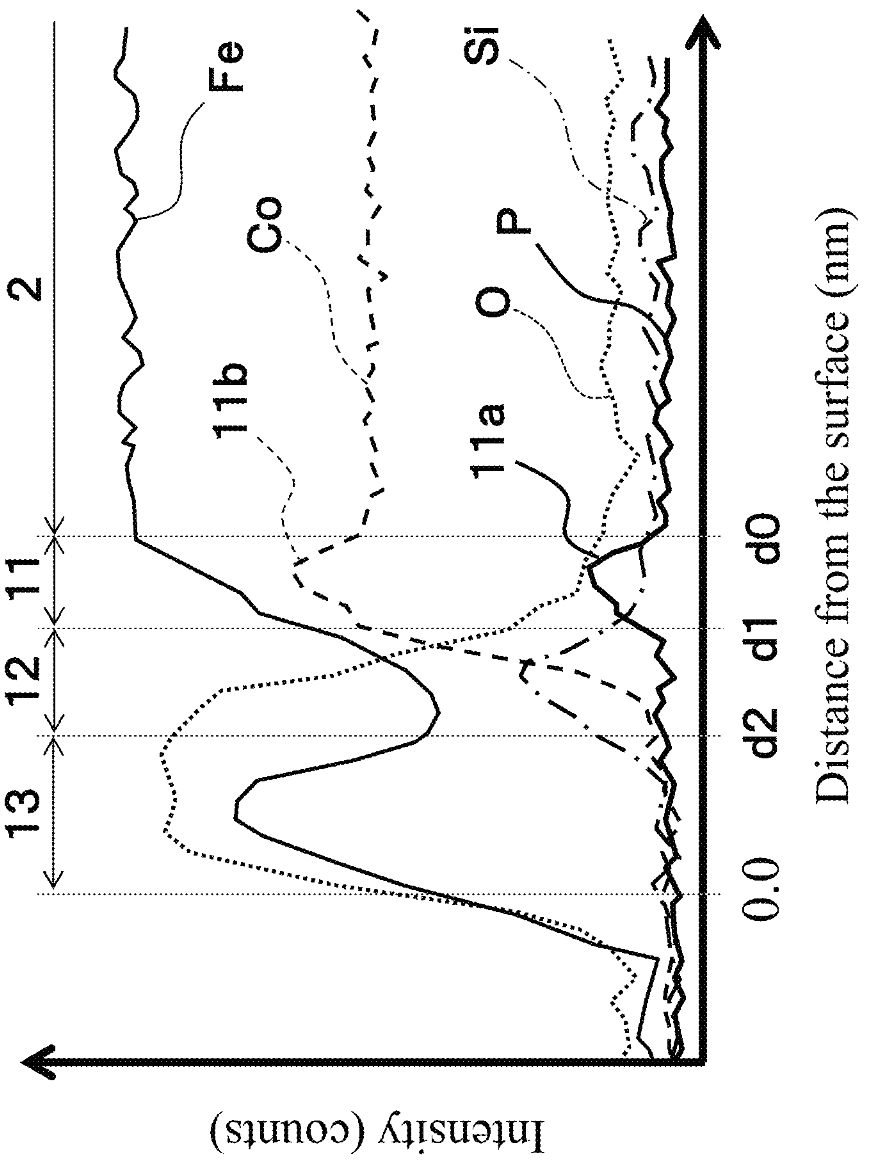
FIG. 3B is an example of a graph obtained by performing a line analysis using EDX along a measurement line $L_M a$ shown in FIG. 1B.

FIG. 3B is a graph which schematically shows the results of a line analysis using EDX along the measurement line $L_M$a indicated in FIG. 1B. When the SB oxide layer 12 exists, as shown in FIG. 3B, peaks of Si or/and B are observed at the position closer to the surface side than where the peak of P is observed, and furthermore, the oxygen intensity increases in a manner which overlaps with the peaks of Si or/and B. Also, when the Fe oxide layer 13 also exists at the surface side of the SB oxide layer 12, the peak of Fe can be confirmed at the position closer to the surface side than where the peaks of Si or/and B are observed. As such, the SB oxide layer 12 and the Fe oxide layer 13 can be confirmed by a line analysis using EDX or EPMA, and other than this, a mapping analysis shown in FIG. 5B can be used to confirm the presences of the SB oxide layer 12 and the Fe oxide layer 13.

Figure 4A:
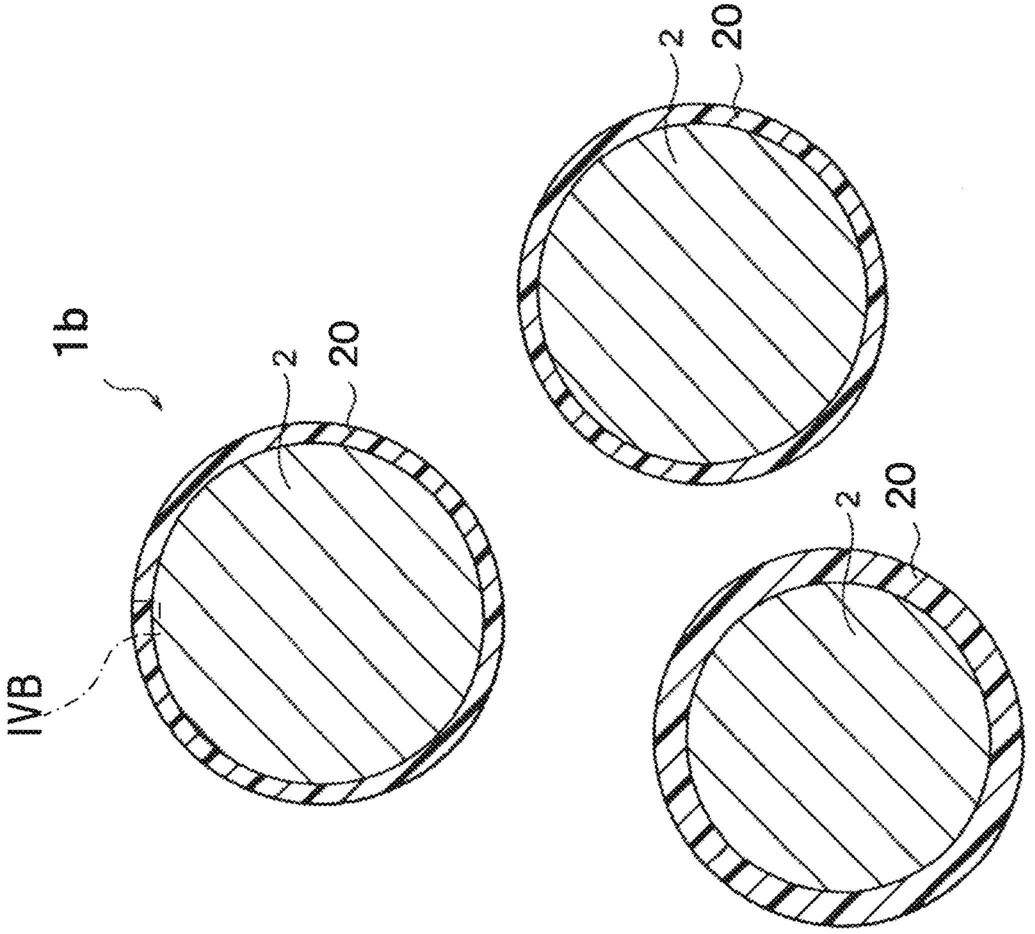
FIG. 4A is a cross section showing a soft magnetic alloy $1_b$ according to an embodiment of the present disclosure.
Figure 4B:
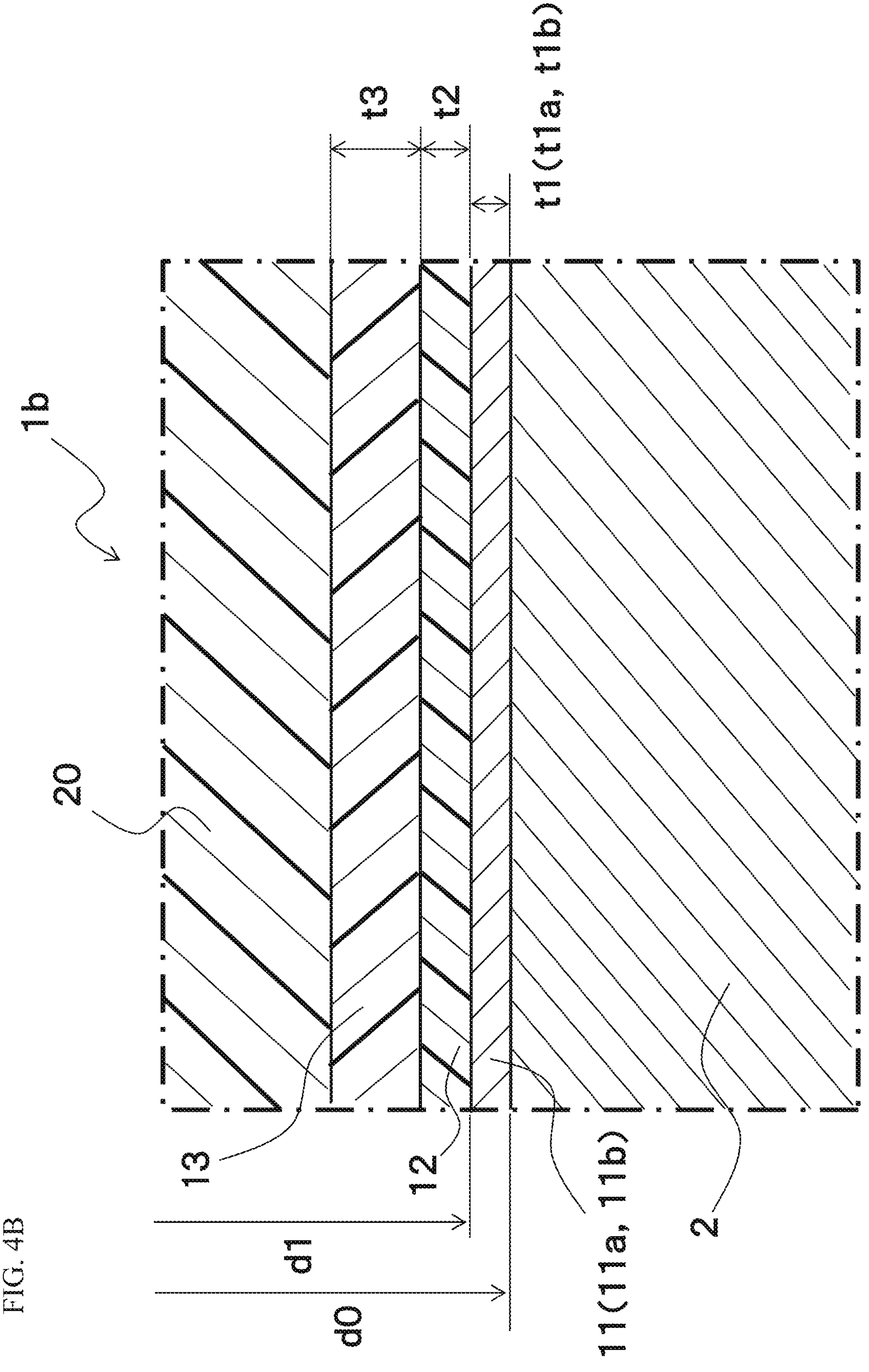
FIG. 4B is an enlarged cross section of an area IVB shown in FIG. 4A.
Figure 5C:
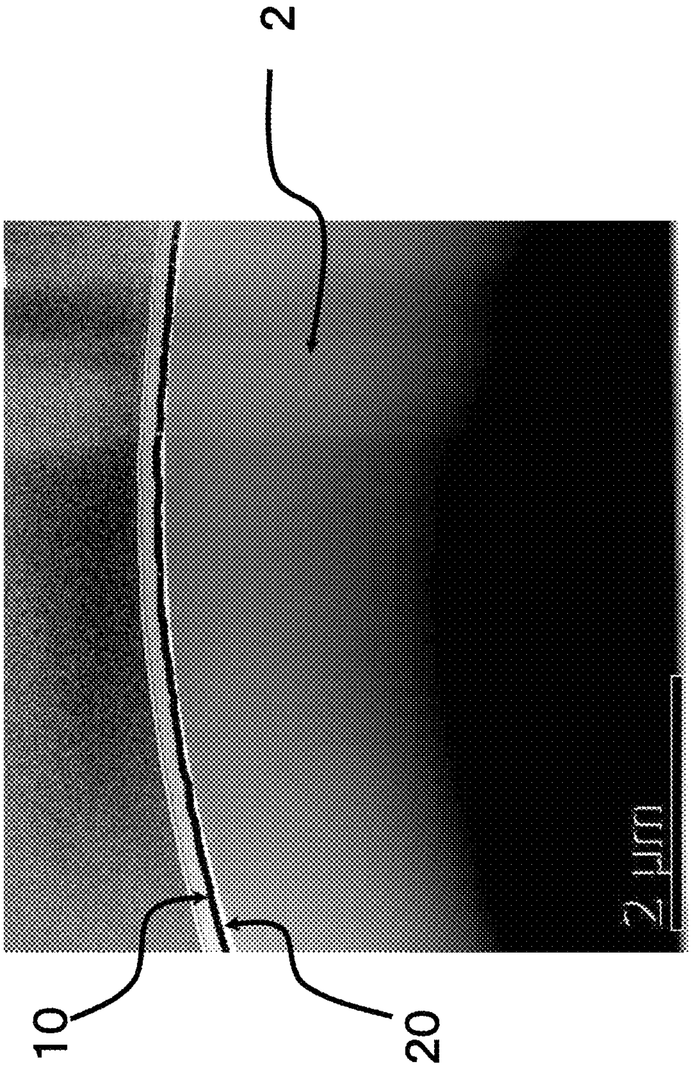
FIG. 5C is an example of a STEM image of the soft magnetic alloy 1*b* shown in FIG. 4A.

Also, as the soft magnetic alloy 1*b* of FIG. 4A and FIG. 4B shows, a coating layer 20 for insulation may be formed at the outside of the P concentrated area 11*a*. This coating layer 20 is a coating layer which is formed by carrying out a surface treatment such as coating or so after the concentrated area 11 is formed. An average thickness of the coating layer 20 is preferably within a range of 5 nm or more and 100 nm or less, and more preferably it is 50 nm or less. That is, when the coating layer 20 is formed, the outermost surface 10 of the soft magnetic alloy 1*b* is constituted by the coating layer 20, and the coating layer 20 is positioned closer the surface side of the soft magnetic alloy 1*b* than the concentrated area 11, the SB oxide layer 12, and the Fe oxide layer 13. In fact, FIG. 5C is an example of a STEM image of the soft magnetic alloy 1*b* shown in FIG. 4A. In said STEM image, an area with a brighter contrast can be confirmed at the outermost surface 10 of the soft magnetic alloy 1*b*, and this area is the coating layer 20.

As discussed in above, the surface structure of the soft magnetic alloy 1 can include other layers (such as the SB oxide layer 12, the Fe oxide layer 13, and the coating layer 20) in addition to the concentrated area 11. Even in case of having said other layers, the concentrated area 11 exists at the side which is in contact with the internal area 2. Further, a perpendicular distance dl (see FIG. 1B and FIG. 4B) from the outermost surface 10 to the P concentrated area 11*a* is preferably 200 nm or less, more preferably 100 nm or less, and even more preferably 50 nm or less. Particularly in case that the coating layer 20 does not exist and the outermost surface 10 is constituted by the SB oxide layer 12 or by the Fe oxide layer 13, the perpendicular distance dl is preferably 30 nm or less, and more preferably 20 nm or less.

Note that, a measurement sample for analyzing the concentrated area 11 is preferably formed by using a microsampling method which uses FIB (Focused Ion Beam). For example, a Pt film of a thickness of 30 nm or so is formed by spattering to the outermost surface 10 of the soft magnetic alloy 1 to protect the surface while processing, then using FIB, an area having a depth of about 2 μm from the outermost surface is cut out, thereby a thin sample is obtained. Then, this thin sample is processed and thinned so that a thickness in a direction perpendicular to the depth direction is 20 nm or less. This sample formed into a thin film may be used as a measurement sample for TEM and HRTEM observation.

Hereinbelow, a method of producing the soft magnetic alloy 1 according to the present embodiment is described.

The main part (internal area 2) of the soft magnetic alloy 1 can be produced by various melting methods, and preferably it may be made by using a method in which a molten is quenched. This is because the amorphous soft magnetic alloy 1 can be easily obtained by quenching. For example, the soft magnetic alloy 1 of a ribbon form can be produced by a single roll method, and the soft magnetic alloy 1 of a powder form can be produced by an atomization method. Hereinbelow, a method of obtaining a soft magnetic alloy ribbon formed by a single roll method, and a method of obtaining a soft magnetic alloy powder formed by a gas atomization method are described.

In a single roll method, raw materials (pure metal and the like) of elements constituting the soft magnetic alloy 1 are prepared and weighed so to satisfy the target alloy composition. Then, the raw materials of the elements are melted to produce a mother alloy. A method of melting for producing the mother alloy is not particularly limited, and for example a method of melting by using high frequency heating in a chamber at a predetermined degree of vacuum may be mentioned.

Next, the above-mentioned mother alloy is heated and melted to obtain a molten. A temperature of the molten may be determined by taking the melting point of the target alloy composition into consideration. For example, the temperature of the molten may be within a range of 1200° C. to 1600° C. In a single roll method, this molten is supplied using a nozzle and the like to a cooled rotating roll, thereby a soft magnetic alloy ribbon is produced along the rotating direction of the roll. A thickness of the ribbon can be regulated by adjusting a rotation speed of the roll, a distance between the nozzle and the roll, a temperature of the molten, and the like. Also, the temperature and the rotation speed of the roll may be set to a condition so that the amorphous soft magnetic alloy can be easily obtained. For example, the temperature of the roll is preferably within a range of 20° C. to 30° C., and a rotation speed is preferably within a range of 20 to 30 m/sec. Note that, an atmosphere inside the chamber is not particularly limited, and for example it can be air atmosphere or an inert gas atmosphere.

In a gas atomization method, as similar to the above-mentioned single roll method, a molten within a range of 1200° C. to 1600° C. is obtained, then the molten is sprayed in the chamber to produce a powder. Specifically, the molten is exhausted from an exhaust port towards a cooling part, and a high-pressured gas is sprayed to exhausted molten metal drops. By spraying the high-pressured gas to the molten metal drops, the molten metal drops scatter at the inside of the chamber, and as these collide against the cooling part (cooling water), the molten metal drops cool solidify and form the soft magnetic alloy powder. The particle shape of the soft magnetic alloy powder obtained by this atomization method is usually a spherical shape, and an average circularity of the soft magnetic alloy powder is preferably 0.8 or more, more preferably 0.9 or more, and even more preferably 0.95 or more.

As the high-pressured gas, an inert gas such as nitrogen gas, argon gas, helium gas, and the like; or a reducing gas such as ammonium decomposition gas and the like is preferably used. A spraying pressure of the high-pressured gas is preferably within a range of 2.0 MPa or more and 10 MPa or less. Also, a spraying amount of the exhausted molten is preferably within a range of 0.5 kg/min or more and 4.0 kg/min or less. In said gas atomization method, the particle size and the shape of the soft magnetic alloy powder can be adjusted by a ratio of the spraying pressure of the high-pressured gas with respect to the spraying amount of the molten.

After obtaining the soft magnetic alloy of a ribbon form or a powder form as discussed in above, this soft magnetic alloy is heat treated at a low temperature in a predetermined oxygen concentration atmosphere under a predetermined pressure, thereby the concentrated area 11 is formed.

Specifically, a holding temperature during the heat treatment is preferably a temperature which does not crystallize the soft magnetic alloy, and for example it is preferably within a range of 200° C. to 400° C. Also, a temperature holding time is preferably within a range of 0.5 hours to 3.0 hours. An oxygen concentration inside a heating furnace is preferably within a range of 20 ppm or more and 2000 ppm or less, and more preferably within a range of 100 ppm or more and 1000 ppm or less. Further, while controlling the oxygen concentration inside the heating furnace as mentioned in above, an inert gas such as argon gas, nitrogen gas, or the like is introduced into the heating furnace so that the inside of the heating furnace has a positive pressure. A gauge pressure inside the heating furnace is preferably within a range of 0.05 kPa or more and 0.50 kPa or less, and in case of forming the Co concentrated area 11*b*, the gauge pressure is more preferably within a range of 0.15 kPa or more and 0.45 kPa or less. Note that, a gauge pressure refers to a pressure of which atmospheric pressure is subtracted from an absolute pressure (a pressure when an absolute vacuum is 0 Pa).

By carrying a heat treatment under such conditions, the P concentrated area 11*a* (that is the concentrated area 11) having a predetermined characteristic is formed to the surface side of the soft magnetic alloy 1, and when Co is included in the soft magnetic alloy 1, the Co concentrated area 11*a* may be formed. Further, when the soft magnetic alloy 1 includes Si or/and B, the SB oxide layer 12 may be formed due to the above-mentioned heat treatment, and depending on the heat treatment conditions, the Fe oxide layer 13 may be formed. Note that, when the soft magnetic alloy 1 is crystalline or nanocrystal (that is, when the amorphous degree X is less than 85%), a pre-heat treatment in order to control the crystallinity may be performed prior to the heat treatment for forming the above-mentioned concentrated area 11.

In case of forming the coating layer 20 as shown in FIG. 4A and FIG. 4B, a coating treatment such as a phosphate coating treatment, a mechanical alloying treatment, a silane coupling treatment, a hydrothermal synthesis, and the like may be performed after the concentrated area 11 is formed by the above-mentioned heat treatment. As a type of coating layer 20 to be formed, phosphates, silicates, soda-lime glass, borosilicate glass, lead glass, aluminosilicate glass, borate glass, sulfate glass, and the like may be mentioned. Note that, as phophates, for example, magnesium phosphate, calcium phosphate, zinc phosphate, manganese phosphate, cadmium phosphate, and the like may be mentioned. As silicates, sodium silicate and the like may be mentioned. When the coating layer 20 is formed, improvements of the voltage resistance and the like can be expected for the magnetic core including the soft magnetic alloy 1.

The soft magnetic alloy 1 including the concentrated area 11 is obtained by going through the above-mentioned steps. The soft magnetic alloy 1 of the present embodiment can be applied to various magnetic components, for example, a coil component such as an inductor, a filter, an antenna, and the like may be mentioned. Particularly, the soft magnetic alloy 1 according to the present embodiment is preferably applied to a magnetic core in a coil component such as an inductor. Note that, the magnetic core including the soft magnetic alloy 1 may include a resin component, or the magnetic core may be formed by mixing the soft mantic alloy 1 and other magnetic particles.

Summarizing the Present Embodiment

In the soft magnetic alloy 1 of the present embodiment, the P concentrated area 11*a* satisfying the predetermined characteristics is formed to the outer side of the internal area 2 having a soft magnetic type alloy composition which includes Fe and P. By having such characteristics, rust formation is suppressed when the soft magnetic alloy 1 is immersed in water, and the corrosion resistance can be improved. Particularly, when the P concentrated area 11*a* has the P concentration degree of 1.5 or more (more preferably 2.0 or more), the corrosion resistance of the soft magnetic alloy 1 can be further improved.

Also, in the concentrated area 11, preferably the Co concentrated area 11*b* exists so that it overlaps with the P concentrated area 11*a*. By having the Co concentrated area 11*b*, the corrosion resistance of the soft magnetic alloy 1 further improves. Also, by having the Co concentration degree of the Co concentrated area 11*b* of larger than 1.20, the corrosion resistance of the soft magnetic alloy 1 can be further improved.

Also, by forming the concentrated area 11 to the amorphous soft magnetic alloy 1 having the amorphous degree of 85% or more, the corrosion resistance of the soft magnetic alloy 1 can be further improved while maintaining a high saturation magnetic flux density Bs.

Hereinabove, the embodiment of the present disclosure is described, however, the present disclosure is not limited to the above-mentioned embodiment, and it may be variously modified within the scope of the present disclosure.

EXAMPLES

Hereinbelow, the present disclosure is described in further detail based on specific examples. Note that, the present disclosure is not limited to the examples. In below shown tables, "*" mark indicates a sample of comparative example.

Experiment 1

In Experiment 1, a soft magnetic alloy powder was produced by using a gas atomization method. In a gas atomization method, the soft magnetic alloy powder of which a volume-based average particle size (D50) was within a range of 15 to 30 μm was obtained under the conditions of a spraying temperature of a molten: 1500° C., a spraying amount of the molten: 1.2 kg/min, a pressure of a high-pressured gas: 7.0 MPa, and a water pressure of a cooling water: 10 MPa. Then, the soft magnetic alloy powder was heat treated under the conditions shown in Table 1, and soft magnetic alloys of Sample No. 2 to 13 were obtained. Also, in Experiment 1, a soft magnetic alloy of Sample No. 1 which was not heat treated was also produced. Using this Sample No. 1 as a standard, evaluations shown in below were carried out.

<Crystal Structure and Composition of the Soft Magnetic Alloy Powder>

The composition of the soft magnetic alloy powder obtained by a gas atomization method was measured using ICP. As a result, in all samples of Experiment 1, the soft magnetic alloy powder (that is the internal area 2) of each sample was confirmed to have an alloy composition satisfying a compositional formula: $(Fe_{0.7}Co_{0.3})_{0.82}B_{0.11}P_{0.02}Si_{0.03}C_{0.01}Cr_{0.01}$ (atomic ratio; $\alpha$=0.300, $\beta$=0, $\gamma$=0, a=0.110, b=0.020, c=0.030, d=0.010, and e=0.010). Also, when the soft magnetic alloy powders of Experiment 1 were performed with X-ray crystallography using XRD, each sample of Experiment 1 showed that the soft magnetic alloy powder (that is the internal area 2) was amorphous satisfying an amorphous degree X of 85% or more.

<Analysis of Surface Structure>

From the soft magnetic alloy of each sample of Experiment 1, a thin sample near the surface was taken by a micro sampling method using FIB. Further, using the thin sample, a mapping analysis was carried out using TEM-EDX to examine a concentrated area 11 (a P concentrated area 11*a* and a Co concentrated area 11*b*). Also, a component analysis of a specific area was carried out using TEM-EELS, and a P concentration degree and a Co concentration degree of the concentrated area 11 were measured. Analysis results of surface structure regarding each sample of Experiment 1 are shown in Table 1. Note that, according to the analysis results of each sample obtained by EELS, the P concentrated area 11*a* and the Co concentrated area 11*b* were each confirmed to be an amorphous metal phase.

<Saturation Magnetic Flux Density Bs>

The saturation magnetic flux density Bs of each sample was measured using a vibrating sample magnetometer (VSM) under the condition of 1000 kA/m magnetic flied. Results are shown in Table 1. When this Bs was 1.50 T or more, it was considered good, and 1.70 T or more was considered even better.

<Immersion Test>

First, before performing the immersion test, a magnetic core sample was produced using the soft magnetic alloy of each sample. Each of the magnetic core sample was produced by going through below described steps. Granules were obtained by mixing 3 parts by mass of an epoxy resin to 100 parts by mass of the soft magnetic alloy. Then, the granules were filled into a mold, and then pressure molded at a pressure of 4 ton/cm$^2$, thereby a magnetic core sample of a toroidal shape having a size of an outer diameter of 11 mmφ, an inner diameter of 6.5 mmφ, and a height of 1.0 mm was obtained.

The immersion test was performed in order to evaluate the corrosion resistance of the magnetic core sample obtained in the above. For the immersion test, the magnetic core sample was immersed in tap water, then a time which took to confirm rust formation by visual observation was measured (rust formation time). In Experiment 1, the corrosion resistance of each sample was evaluated with respect to a rust formation time T1 of the Sample No. 1. Specifically, in Experiment 1, when a rust formation time of a sample was less than 1.0 times of T1 (the rust formation time of Sample No. 1), then it was evaluated as "F (Fail)"; when a rust formation time of a sample was more than 1.0 times and less than 1.2 times of T1, then it was evaluated as "G (Good)"; and when a rust formation time of a sample was 1.2 times or more than T1, it was evaluated as "VG (very good)". Results of the immersion test evaluated by the above-mentioned "F, G, and VG" are shown in Table 1.

TABLE 1

| | Heat treatment condition | | | | Analysis result of surface structure | | | | | |
|---|---|---|---|---|---|---|---|---|---|---|
| | | | | | P concentrated area | | Co concentrated area | | | |
| Sample No. | Holding Temp. ° C. | Holding time h | Oxygen concentration ppm | Gauge pressure kPa | Formation | P concentration degree (—) | Formation | Co concentration degree (—) | Saturation magnetic flux density Bs T | Immersion test Evaluation |
| 1※ | — | — | — | — | None | — | None | — | 1.69 | Standard |
| 2※ | 200 | 1.0 | 20 | 0.00 | None | — | None | — | 1.69 | F |
| 3 | 200 | 1.0 | 20 | 0.05 | Formed | 1.31 | None | — | 1.72 | G |
| 4 | 200 | 1.0 | 20 | 0.15 | Formed | 1.43 | Formed | 1.10 | 1.72 | G |

TABLE 1-continued

| | Heat treatment condition | | | | Analysis result of surface structure: P concentrated area | | Analysis result of surface structure: Co concentrated area | | | |
|---|---|---|---|---|---|---|---|---|---|---|
| Sample No. | Holding Temp. ° C. | Holding time h | Oxygen concentration ppm | Gauge pressure kPa | Formation | P concentration degree (—) | Formation | Co concentration degree (—) | Saturation magnetic flux density Bs T | Immersion test Evaluation |
| 5 | 200 | 1.0 | 20 | 0.30 | Formed | 1.68 | Formed | 1.26 | 1.72 | VG |
| 6 | 200 | 1.0 | 20 | 0.45 | Formed | 1.99 | Formed | 1.46 | 1.72 | VG |
| 7 | 300 | 1.0 | 20 | 0.15 | Formed | 1.63 | Formed | 1.45 | 1.72 | VG |
| 8 | 400 | 1.0 | 20 | 0.15 | Formed | 1.78 | Formed | 1.56 | 1.72 | VG |
| 9 | 200 | 0.5 | 100 | 0.30 | Formed | 1.68 | Formed | 1.77 | 1.72 | VG |
| 10 | 200 | 2.0 | 100 | 0.30 | Formed | 2.04 | Formed | 1.99 | 1.72 | VG |
| 11 | 200 | 1.0 | 100 | 0.30 | Formed | 2.41 | Formed | 2.01 | 1.71 | VG |
| 12 | 200 | 1.0 | 500 | 0.30 | Formed | 2.59 | Formed | 2.44 | 1.71 | VG |
| 13 | 200 | 1.0 | 1000 | 0.30 | Formed | 2.82 | Formed | 2.52 | 1.71 | VG |

As shown in Table 1, in Sample No. 3 to 13 which were heat treated under predetermined conditions, the P concentrated area 11*a* was formed, and the rust formation time was longer than that of Sample No. 1 and 2. Particularly, in Sample No. 4 to 13 which were heat treated under a higher gauge pressure than Sample No. 3, the Co concentrated area 11*b* was formed in a way which overlapped with the P concentrated area 11*a*. Also, Sample No. 4 to 13 each showed a further improved corrosion resistance than that of Sample No. 3. According to the results, by forming the P concentrated area 11*a* at the surface side of the soft magnetic alloy, a high Bs can be ensured, and also the relative corrosion resistance compared to the standard alloy (Sample No. 1) was improved. Also, by forming the P concentrated area 11*a* in way which overlaps with the Co concentrated area 11*b*, the corrosion resistance further improved.

Note that, the specific time of rust formation is not indicated in Table 1, however it was confirmed that as the Co concentration degree increased, the rust formation time compared to Sample No. 1 became longer, and a relative corrosion resistance tended to further improve.

Experiment 2

In Experiment 2, the alloy compositions were changed and obtained soft magnetic alloys of Sample No. 14 to 105. Tables 2 to 7 show the alloy composition of each Sample analyzed using ICP.

Specifically, for Sample No. 14 to 29 shown in Table 2, each sample satisfied a compositional formula: $(Fe_{1-\alpha}Co_{\alpha})_{0.82}B_{0.11}P_{0.02}Si_{0.03}C_{0.01}Cr_{0.01}$ (atomic ratio; β=0, γ=0, a=0.110, b=0.020, c=0.030, d=0.010, and e=0.010), and a Co atomic ratio α was varied, thereby the soft magnetic alloy was produced. Note that, Sample No. 22 is the same sample as Sample No. 1 shown in Table 1, and Sample No. 23 is the same sample as Sample No. 11 shown in Table 1.

Also, for the soft magnetic alloys of Sample No. 30 to 49 shown in Table 3, the atomic ratios of Co, Ni, and X1 were respectively fixed to α=0.300, β=0, and γ=0; and then the atomic ratios of metalloids (B, P, Si, and C) and Cr were varied.

Also, for Sample No. 50 to 53 shown in Table 4, each sample satisfied a compositional formula: $(Fe_{(1-(0.3+\beta))}Co_{0.3}Ni_{\beta})_{0.82}B_{0.11}P_{0.02}Si_{0.03}C_{0.01}Cr_{0.01}$ (atomic ratios: α=0.300, γ=0, a=0.110, b=0.020, c=0.030, d=0.010, and e=0.010), and a Ni atomic ratio β was varied, thereby the soft magnetic alloy was produced.

Also, for Sample No. 54 to 105 shown in Tables 5 to 7, each sample satisfied a compositional formula: $((Fe_{0.7}Co_{0.3})_{0.975}X1_{0.025})_{0.82}B_{0.11}P_{0.02}Si_{0.03}C_{0.01}Cr_{0.01}$ (atomic ratios; α=0.300, β=0, γ=0.025, a=0.110, b=0.020, c=0.030, d=0.010, and e=0.010), and a type of X1 element was varied, thereby the soft magnetic alloy was produced.

Note that, all of the soft magnetic alloys of Experiment 2 had an amorphous degree X of 85% or more. Also, in Experiment 2, for each alloy composition, a sample performed with a predetermined heat treatment and a sample without the predetermined heat treatment were formed; and in Table 2 to Table 7, the sample performed with the heat treatment was shown as "Y", and the sample without the heat treatment was shown as "N". Also, conditions of the heat treatment of Experiment 2 were a holding temperature: 200° C., a holding time: 1 h, an oxygen concentration in a heating furnace: 100 ppm, and a gauge pressure in the heating furnace: 0.30 kPa.

Also, for each of Sample No. 14 to 105 of Experiment 2, as similar to Experiment 1, Bs was measured and the immersion test was performed. In the immersion test of Experiment 2, for the same composition, the rust formation time of a sample without the heat treat was defined as $T_N$, and the rust formation time of a sample performed with the heat treatment was defined as $T_Y$, then a sample which showed $T_Y/T_N<1.0$ was evaluated as "F (Fail)", a sample which showed $1.0\leq T_Y/T_N<1.2$ was evaluated as "G (Good)", and a sample which showed $1.2\leq T_Y/T_N$ was evaluated "VG (Very Good)". Evaluation results are shown in Tables 2 to 7.

TABLE 2

| Sample No. | Alloy composition: $(Fe_{(1-\alpha)}Co_{\alpha})_{(1-(a+b+c+d+e))}B_aP_bSi_cC_dCr_e$ ($\beta = 0$, $\gamma = 0$) Co α | B a | P b | Si c | C d | Cr e | Heat treated or not Y or N | Analysis result of surface structure: P concentrated area Formation | P concentration degree (—) | Co concentrated area Formation | Co concentration degree (—) | Saturation magnetic flux density Bs T | Immersion test Evaluation |
|---|---|---|---|---|---|---|---|---|---|---|---|---|---|
| 14※ | 0.00 | 0.11 | 0.02 | 0.03 | 0.01 | 0.01 | N | None | — | None | — | 1.65 | Standard |
| 15 | 0.00 | 0.11 | 0.02 | 0.03 | 0.01 | 0.01 | Y | Formed | 2.40 | None | — | 1.66 | G |
| 16※ | 0.05 | 0.11 | 0.02 | 0.03 | 0.01 | 0.01 | N | None | — | None | — | 1.65 | Standard |
| 17 | 0.05 | 0.11 | 0.02 | 0.03 | 0.01 | 0.01 | Y | Formed | 2.35 | Formed | 3.70 | 1.66 | VG |
| 18※ | 0.10 | 0.11 | 0.02 | 0.03 | 0.01 | 0.01 | N | None | — | None | — | 1.65 | Standard |
| 19 | 0.10 | 0.11 | 0.02 | 0.03 | 0.01 | 0.01 | Y | Formed | 2.36 | Formed | 5.54 | 1.67 | VG |
| 20※ | 0.15 | 0.11 | 0.02 | 0.03 | 0.01 | 0.01 | N | None | — | None | — | 1.66 | Standard |
| 21 | 0.15 | 0.11 | 0.02 | 0.03 | 0.01 | 0.01 | Y | Formed | 2.24 | Formed | 3.90 | 1.68 | VG |
| 22※ (1) | 0.30 | 0.11 | 0.02 | 0.03 | 0.01 | 0.01 | N | None | — | None | — | 1.69 | Standard |
| 23 (11) | 0.30 | 0.11 | 0.02 | 0.03 | 0.01 | 0.01 | Y | Formed | 2.41 | Formed | 2.01 | 1.71 | VG |
| 24※ | 0.50 | 0.11 | 0.02 | 0.03 | 0.01 | 0.01 | N | None | — | None | — | 1.6 | Standard |
| 25 | 0.50 | 0.11 | 0.02 | 0.03 | 0.01 | 0.01 | Y | Formed | 2.31 | Formed | 1.98 | 1.63 | VG |
| 26※ | 0.60 | 0.11 | 0.02 | 0.03 | 0.01 | 0.01 | N | None | — | None | — | 1.55 | Standard |
| 27 | 0.60 | 0.11 | 0.02 | 0.03 | 0.01 | 0.01 | Y | Formed | 2.44 | Formed | 1.82 | 1.57 | VG |
| 28※ | 0.70 | 0.11 | 0.02 | 0.03 | 0.01 | 0.01 | N | None | — | None | — | 1.51 | Standard |
| 29 | 0.70 | 0.11 | 0.02 | 0.03 | 0.01 | 0.01 | Y | Formed | 2.29 | Formed | 1.72 | 1.53 | VG |

TABLE 3

| Sample No. | Alloy composition: $(Fe_{(1-\alpha)}Co_{\alpha})_{(1-(a+b+c+d+e))}B_aP_bSi_cC_dCr_e$ ($\beta = 0$, $\gamma = 0$) Co α | B a | P b | Si c | C d | Cr e | Heat treated or not Y or N | Analysis result of surface structure: P concentrated area Formation | P concentration degree (—) | Co concentrated area Formation | Co concentration degree (—) | Saturation magnetic flux density Bs T | Immersion test Evaluation |
|---|---|---|---|---|---|---|---|---|---|---|---|---|---|
| 30※ | 0.300 | 0.020 | 0.040 | 0.030 | 0.010 | 0.010 | N | None | — | None | — | 1.78 | Standard |
| 31 | 0.300 | 0.020 | 0.040 | 0.030 | 0.010 | 0.010 | Y | Formed | 2.85 | Formed | 2.15 | 1.80 | VG |
| 32※ | 0.300 | 0.180 | 0.020 | 0.000 | 0.000 | 0.010 | N | None | — | None | — | 1.49 | Standard |
| 33 | 0.300 | 0.180 | 0.020 | 0.000 | 0.000 | 0.010 | Y | Formed | 2.15 | Formed | 2.42 | 1.52 | VG |
| 34※ | 0.300 | 0.110 | 0.030 | 0.030 | 0.010 | 0.010 | N | None | — | None | — | 1.67 | Standard |
| 35 | 0.300 | 0.110 | 0.030 | 0.030 | 0.010 | 0.010 | Y | Formed | 2.32 | Formed | 2.23 | 1.70 | VG |
| 36※ | 0.300 | 0.110 | 0.070 | 0.030 | 0.010 | 0.010 | N | None | — | None | — | 1.53 | Standard |
| 37 | 0.300 | 0.110 | 0.070 | 0.030 | 0.010 | 0.010 | Y | Formed | 2.91 | Formed | 2.42 | 1.55 | VG |
| 38※ | 0.300 | 0.140 | 0.020 | 0.000 | 0.010 | 0.010 | N | None | — | None | — | 1.72 | Standard |
| 39 | 0.300 | 0.140 | 0.020 | 0.000 | 0.010 | 0.010 | Y | Formed | 1.89 | Formed | 2.25 | 1.74 | VG |
| 40※ | 0.300 | 0.110 | 0.020 | 0.100 | 0.010 | 0.010 | N | None | — | None | — | 1.52 | Standard |
| 41 | 0.300 | 0.110 | 0.020 | 0.100 | 0.010 | 0.010 | Y | Formed | 2.31 | Formed | 2.54 | 1.54 | VG |
| 42※ | 0.300 | 0.110 | 0.020 | 0.030 | 0.000 | 0.010 | N | None | — | None | — | 1.70 | Standard |
| 43 | 0.300 | 0.110 | 0.020 | 0.030 | 0.000 | 0.010 | Y | Formed | 2.25 | Formed | 2.31 | 1.71 | VG |
| 44※ | 0.300 | 0.110 | 0.020 | 0.030 | 0.050 | 0.010 | N | None | — | None | — | 1.49 | Standard |
| 45 | 0.300 | 0.110 | 0.020 | 0.030 | 0.050 | 0.010 | Y | Formed | 2.44 | Formed | 2.60 | 1.51 | VG |
| 46※ | 0.300 | 0.110 | 0.020 | 0.030 | 0.010 | 0.000 | N | None | — | None | — | 1.76 | Standard |
| 47 | 0.300 | 0.110 | 0.020 | 0.030 | 0.010 | 0.000 | Y | Formed | 2.37 | Formed | 2.51 | 1.78 | VG |
| 48※ | 0.300 | 0.110 | 0.020 | 0.030 | 0.010 | 0.040 | N | None | — | None | — | 1.63 | Standard |
| 49 | 0.300 | 0.110 | 0.020 | 0.030 | 0.010 | 0.040 | Y | Formed | 2.32 | Formed | 2.44 | 1.64 | VG |

TABLE 4

| Sample No. | Alloy composition: $(Fe_{(1-(\alpha+\beta))}Co_{\alpha}Ni_{\beta})_{0.82}B_{0.11}P_{0.02}Si_{0.03}C_{0.01}Cr_{0.01}$ ($\gamma$ = 0) Co $\alpha$ | Ni $\beta$ | Heat treated or not Y or N | Analysis result of surface structure: P concentrated area Formation | P concentration degree (—) | Co concentrated area Formation | Co concentration degree (—) | Saturation magnetic flux density Bs T | Immersion test Evaluation |
|---|---|---|---|---|---|---|---|---|---|
| 50※ | 0.300 | 0.005 | N | None | — | None | — | 1.70 | Standard |
| 51 | 0.300 | 0.005 | Y or N | Formed | 2.11 | Formed | 2.09 | 1.71 | VG |
| 52※ | 0.300 | 0.200 | N | None | — | None | — | 1.50 | Standard |
| 53 | 0.300 | 0.200 | Y | Formed | 2.35 | Formed | 1.38 | 1.51 | VG |

TABLE 5

| Sample No. | Alloy composition: $((Fe_{(1-\alpha)}Co_{\alpha})_{1-\gamma}X1_{\gamma})_{0.820}B_{0.11}P_{0.02}Si_{0.03}C_{0.01}Cr_{0.01}$ ($\beta$ = 0) Co $\alpha$ | X1 Element type | $\gamma$ | Heat treated or not Y or N | Analysis result of surface structure: P concentrated area Formation | P concentration degree (—) | Co concentrated area Formation | Co concentration degree (—) | Saturation magnetic flux density Bs T | Immersion test Evaluation |
|---|---|---|---|---|---|---|---|---|---|---|
| 54※ | 0.300 | Al | 0.025 | N | None | — | None | — | 1.63 | Standard |
| 55 | 0.300 | Al | 0.025 | Y | Formed | 3.09 | Formed | 2.35 | 1.61 | VG |
| 56※ | 0.300 | Zn | 0.025 | N | None | — | None | — | 1.63 | Standard |
| 57 | 0.300 | Zn | 0.025 | Y | Formed | 2.46 | Formed | 2.31 | 1.64 | VG |
| 58※ | 0.300 | Sn | 0.025 | N | None | — | None | — | 1.62 | Standard |
| 59 | 0.300 | Sn | 0.025 | Y | Formed | 3.05 | Formed | 2.27 | 1.62 | VG |
| 60※ | 0.300 | Cu | 0.025 | N | None | — | None | — | 1.61 | Standard |
| 61 | 0.300 | Cu | 0.025 | Y | Formed | 2.94 | Formed | 2.30 | 1.59 | VG |
| 62※ | 0.300 | Bi | 0.025 | N | None | — | None | — | 1.62 | Standard |
| 63 | 0.300 | Bi | 0.025 | Y | Formed | 2.99 | Formed | 2.34 | 1.60 | VG |
| 64※ | 0.300 | La | 0.025 | N | None | — | None | — | 1.52 | Standard |
| 65 | 0.300 | La | 0.025 | Y | Formed | 2.82 | Formed | 2.24 | 1.52 | VG |
| 66※ | 0.300 | Y | 0.025 | N | None | — | None | — | 1.57 | Standard |
| 67 | 0.300 | Y | 0.025 | Y | Formed | 2.93 | Formed | 2.30 | 1.57 | VG |
| 68※ | 0.300 | Ga | 0.025 | N | None | — | None | — | 1.57 | Standard |
| 69 | 0.300 | Ga | 0.025 | Y | Formed | 2.53 | Formed | 2.29 | 1.56 | VG |
| 70※ | 0.300 | Ti | 0.025 | N | None | — | None | — | 1.52 | Standard |
| 71 | 0.300 | Ti | 0.025 | Y | Formed | 2.48 | Formed | 2.32 | 1.52 | VG |
| 72※ | 0.300 | Zr | 0.025 | N | None | — | None | — | 1.53 | Standard |
| 73 | 0.300 | Zr | 0.025 | Y | Formed | 2.68 | Formed | 2.30 | 1.53 | VG |
| 74※ | 0.300 | Hf | 0.025 | N | None | — | None | — | 1.52 | Standard |
| 75 | 0.300 | Hf | 0.025 | Y | Formed | 2.55 | Formed | 2.27 | 1.53 | VG |
| 76※ | 0.300 | Nb | 0.025 | N | None | — | None | — | 1.52 | Standard |
| 77 | 0.300 | Nb | 0.025 | Y | Formed | 2.48 | Formed | 2.30 | 1.51 | VG |

TABLE 6

| Sample No | Alloy composition: $((Fe_{(1-\alpha)}Co_{\alpha})_{1-\gamma}X1_{\gamma})_{0.820}B_{0.11}P_{0.02}Si_{0.03}C_{0.01}Cr_{0.01}$ ($\beta$ = 0) Co $\alpha$ | X1 Element type | $\gamma$ | Heat treated or not Y or N | Analysis result of surface structure: P concentrated area Formation | P concentration degree (—) | Co concentrated area Formation | Co concentration degree (—) | Saturation magnetic flux density Bs T | Immersion test Evalution |
|---|---|---|---|---|---|---|---|---|---|---|
| 78※ | 0.300 | Ta | 0.025 | N | None | — | None | — | 1.51 | Standard |
| 79 | 0.300 | Ta | 0.025 | Y | Formed | 2.56 | Formed | 2.27 | 1.51 | VG |

TABLE 6-continued

| | Alloy composition: $((Fe_{(1-\alpha)}Co_{\alpha})_{1-\gamma}X1_{\gamma})_{0.820}B_{0.11}P_{0.02}Si_{0.03}C_{0.01}Cr_{0.01}$ ($\beta = 0$) | | | | Analysis result of surface structure | | | | | |
|---|---|---|---|---|---|---|---|---|---|---|
| | | X1 | | | P concentrated area | | Co concentrated area | | | |
| Sample No | Co α | Element type | γ | Heat treated or not Y or N | Formation | P concentration degree (—) | Formation | Co concentration degree (—) | Saturation magnetic flux density Bs T | Immersion test Evalution |
| 80※ | 0.300 | Mo | 0.025 | N | None | — | None | — | 1.51 | Standard |
| 81 | 0.300 | Mo | 0.025 | Y | Formed | 2.33 | Formed | 2.28 | 1.52 | VG |
| 82※ | 0.300 | V | 0.025 | N | None | — | None | — | 1.51 | Standard |
| 83 | 0.300 | V | 0.025 | Y | Formed | 2.71 | Formed | 2.33 | 1.51 | VG |
| 84※ | 0.300 | W | 0.025 | N | None | — | None | — | 1.51 | Standard |
| 85 | 0.300 | W | 0.025 | Y | Formed | 2.38 | Formed | 2.31 | 1.52 | VG |
| 86※ | 0.300 | Ga | 0.025 | N | None | — | None | — | 1.59 | Standard |
| 87 | 0.300 | Ga | 0.025 | Y | Formed | 2.79 | Formed | 2.26 | 1.57 | VG |
| 88※ | 0.300 | Mg | 0.025 | N | None | — | None | — | 1.58 | Standard |
| 89 | 0.300 | Mg | 0.025 | Y | Formed | 3.05 | Formed | 2.37 | 1.57 | VG |
| 90※ | 0.300 | S | 0.025 | N | None | — | None | — | 1.60 | Standard |
| 91 | 0.300 | S | 0.025 | Y | Formed | 2.30 | Formed | 2.28 | 1.58 | VG |
| 92※ | 0.300 | N | 0.025 | N | None | — | None | — | 1.60 | Standard |
| 93 | 0.300 | N | 0.025 | Y | Formed | 2.40 | Formed | 2.29 | 1.60 | VG |
| 94※ | 0.300 | O | 0.025 | N | None | — | None | — | 1.60 | Standard |
| 95 | 0.300 | O | 0.025 | Y | Formed | 2.64 | Formed | 2.19 | 1.58 | VG |

TABLE 7

| | Alloy composition: $((Fe_{(1-\alpha)}Co_{\alpha})_{1-\gamma}X1_{\gamma})_{0.820}B_{0.11}P_{0.02}Si_{0.03}C_{0.01}Cr_{0.01}$ ($\beta = 0$) | | | | Analysis result of surface structure | | | | | |
|---|---|---|---|---|---|---|---|---|---|---|
| | | X1 | | | P concentrated area | | Co concentrated area | | | |
| Sample No. | Co α | Element type | γ | Heat treated or not Y or N | Formation | P concentration degree (—) | Formation | Co concentration degree (—) | Saturation magnetic flux density Bs T | Immersion test Evaluation |
| 96※ | 0.300 | Ag | 0.025 | N | None | — | None | — | 1.54 | Standard |
| 97 | 0.300 | Ag | 0.025 | Y | Formed | 2.82 | Formed | 2.31 | 1.54 | VG |
| 98※ | 0.300 | As | 0.025 | N | None | — | None | — | 1.53 | Standard |
| 99 | 0.300 | As | 0.025 | Y | Formed | 2.71 | Formed | 2.37 | 1.54 | VG |
| 100※ | 0.300 | Sb | 0.025 | N | None | — | None | — | 1.52 | Standard |
| 101 | 0.300 | Sb | 0.025 | Y | Formed | 2.58 | Formed | 2.34 | 1.50 | VG |
| 102※ | 0.300 | Au | 0.025 | N | None | — | None | — | 1.54 | Standard |
| 103 | 0.300 | Au | 0.025 | Y | Formed | 2.58 | Formed | 2.30 | 1.54 | VG |
| 104※ | 0.300 | Pt | 0.025 | N | None | — | None | — | 1.52 | Standard |
| 105 | 0.300 | Pt | 0.025 | Y | Formed | 2.14 | Formed | 2.33 | 1.51 | VG |

As shown in Tables 2 to 7, the samples which were performed with a predetermined heat treatment showed a higher corrosion resistance than the samples which were not performed with the heat treatment. As a result, when the alloy composition was within the range shown in Experiment 2, by forming the concentrated area 11 (the P concentrated area 11*a* and the Co concentrated area 11*b*) satisfying the predetermined characteristics, a corrosion resistance can be improved while maintaining a high Bs.

Note that, according to the results shown in Table 2, as the Co amount increased in the internal area 2 (that is, as the Co amount of the soft magnetic alloy increased), it took longer time until the rust was formed. That is, as the Co amount in the internal area 2 increased, the corrosion resistance, which is an absolute evaluation, improved. Note that, as Sample No. 29 of Table 2 shows, when the Co amount in the internal area 2 was high, the Co concentration degree rather tended to decrease. Also, compared to Sample No. 29, a relative improvement effect of the corrosion resistance (that is, the corrosion resistance with respect to the standard alloy) was better in Sample No. 17, 19, 21, 23, 25, and 27 which had high Co concentration degree. That is, according to this result, as the Co concentration degree increased, the improvement effect of the corrosion resistance with respect to the standard alloy (the sample without the heat treatment which was the treatment for forming the concentrated area) was further improved.

Experiment 3

In Experiment 3, an amorphous soft magnetic alloy powder having the amorphous degree X of 85% or more (Sample No. 1 and 11), and a nanocrystal soft magnetic alloy powder having the amorphous degree X of less than 85% (Sample No. 106 and 107), and a crystalline soft magnetic alloy powder having the amorphous degree X of less than 85% (Sample No. 108 and 109) were produced. Then, the influence to the corrosion resistance due to the difference of the crystal structures of the soft magnetic alloys was examined.

In Experiment 3, the crystal structure of each sample was regulated by a pre-heat treatment. Specifically, in Sample No. 1 and 11 of Experiment 3, an amorphous soft magnetic alloy powder was obtained since the per-heat treatment was not performed. Also, in Sample No. 106 and 107 of Experiment 3, by performing the pre-heat treatment at a holding temperature: 500° C., a nanocrystal soft magnetic alloy powder was obtained. Also, in Sample No. 108 and 109 of Experiment 3, by performing the pre-heat treatment at a holding temperature: 650° C., a crystalline soft magnetic alloy powder was obtained. Note that, other conditions of the above-mentioned pre-heat treatment were, a temperature increasing rate: 100° C./min, a furnace atmosphere: Ar atmosphere, and a gauge pressure inside the heating furnace: 0.0 kPa, thereby the crystal structure was controlled in a state which did not form the concentrated area 11.

The composition of the soft magnetic alloy of each sample of Experiment 3 was $(Fe_{0.7}Co_{0.3})_{0.82}B_{0.11}P_{0.02}Si_{0.03}C_{0.01}Cr_{0.01}$ Also, in Experiment 3, for each crystal structure, a sample carried out with the heat treatment for forming the concentrated area 11, and a sample without the heat treatment were produced. In Table 8, the sample performed with the heat treatment was shown as "Y", and the sample without the heat treatment was shown as "N". Note that, for samples which were performed with the pre-heat treatment (Sample No. 107 and 109), the heat treatment for forming the concentrated area 11 was performed after the pre-heat treatment. Also, conditions of the heat treatment of Experiment 3 were a holding temperature: 200° C., a holding time: 1.0 h, an oxygen concentration in a heating furnace: 100 ppm, and a gauge pressure in the heating furnace: 0.3 kPa.

Also, in Experiment 3 as similar to Experiment 2, Bs was measured and the immersion test was performed. Regarding the immersion test of Experiment 3, for the same crystal structure, the rust formation time of a sample without the heat treat was defined as $T_N$, and the rust formation time of a sample performed with the heat treatment was defined as $T_Y$, then a sample which showed $T_Y/T_N<1.0$ was evaluated as "F (Fail)", a sample which showed $1.0 \leq T_Y/T_N<1.2$ was evaluated as "G (Good)", and a sample which showed $1.2 \leq T_Y/T_N$ was evaluated "VG (Very Good)". Evaluation results are shown in Table 8.

TABLE 8

| Sample No. | Alloy composition: $(Fe_{(1-\alpha)}Co_{\alpha})_{(1-(a+b+c+d+e))}B_aP_bSi_cC_dCr_e$ ($\beta$ = 0, $\gamma$ = 0) Co $\alpha$ | B a | P b | Si c | C d | Cr e | Crystal structure of alloy powder (before low temp. oxidation treatment) (—) | Heat treated or not Y or N | Analysis result of surace structure: P concentrated area Formation | P concentration degree (—) | Co concentrated area Formation | Co concentration degree (—) | Saturation magnetic flux density Bs T | Immersion test Evaluation |
|---|---|---|---|---|---|---|---|---|---|---|---|---|---|---|
| 1※ | 0.30 | 0.11 | 0.02 | 0.03 | 0.01 | 0.01 | Amorphous | N | None | — | None | — | 1.69 | Standard |
| 11 | 0.30 | 0.11 | 0.02 | 0.03 | 0.01 | 0.01 | Amorphous | Y | Formed | 2.41 | Formed | 2.01 | 1.71 | VG |
| 106※ | 0.30 | 0.11 | 0.02 | 0.03 | 0.01 | 0.01 | Nanocrystal | N | None | — | None | — | 1.72 | Standard |
| 107 | 0.30 | 0.11 | 0.02 | 0.03 | 0.01 | 0.01 | Nanocrystal | Y | Formed | 2.40 | Formed | 1.97 | 1.72 | VG |
| 108※ | 0.30 | 0.11 | 0.02 | 0.03 | 0.01 | 0.01 | Crystalline | N | None | — | None | — | 1.78 | Standard |
| 109 | 0.30 | 0.11 | 0.02 | 0.03 | 0.01 | 0.01 | Crystalline | Y | Formed | 2.28 | Formed | 1.79 | 1.79 | VG |

As shown in Table 8, even when the soft magnetic alloy is constituted by nanocrystal or crystalline, as similar to the case of amorphous, Sample No. 107 and 109 which were formed with the P concentrated area 11*a* and the Co concentrated area 11*b* by performing the predetermined heat treatment had an improved corrosion resistance compared to Sample No. 106 and 108 which were not performed with the heat treatment. Also, when the results of Sample No. 106 to 109 were compared to the results of Sample No. 1 and 11, in case the soft magnetic alloy was amorphous, the rust formation time compared to the standard alloy became longer, hence the relative improvement effect of the corrosion resistance was particularly good.

Experiment 4

In Experiment 4, a soft magnetic alloy sample of a ribbon form was produced using a single roll method (Sample No. 110 and 111). Conditions for forming the soft magnetic alloy ribbon were, a temperature of a molten sprayed to a roll: 1300° C., a roll temperature: 30° C., and a roll rotation speed: 25 m/sec. Also, the inside of the chamber was air atmosphere. The soft magnetic alloy ribbon obtained under the above-mentioned conditions had a thickness of 20 to 25 μm, a width of a short direction of about 5 mm, and a length of ribbon of about 10 m.

Also, in Experiment 4, as similar to Experiment 1, the alloy compositions of Sample No. 110 and 111 were measured using ICP, and it was confirmed that both samples satisfied the compositional formula: $(Fe_{0.7}Co_{0.3})_{0.82}B_{0.11}P_{0.02}Si_{0.03}C_{0.01}Cr_{0.01}$ (atomic ratios; $\alpha$=0.300, $\beta$=0, $\gamma$=0, a=0.110, b=0.020, c=0.030, d=0.010, and e=0.010). Further, when the crystal structure of the soft magnetic alloy ribbons of Sample No. 110 and 111 were measured using XRD, the amorphous crystal structure having the amorphous degree X: 85% or higher was confirmed in both of Sample No. 110 and 111.

For the soft magnetic alloy ribbon of Sample No. 110, the heat treatment was not performed, and an analysis of the surface structure, Bs measurement, and the immersion test were performed. On the other hand, the soft magnetic alloy ribbon of Sample No. 111 was performed with a heat treatment under the conditions shown in Table 9, and the same evaluations as for Sample No. 106 were carried out. Note that, in the immersion test of the soft magnetic alloy ribbon, the ribbon was cut into an arbitrary size (a length of about 4 cm×a width of about 5 mm) to prepare a sample for immersion test. Then, the sample of a ribbon form for immersion test was immersed in tap water. Results of the immersion test of Experiment 4 were evaluated as same as Experiment 1. The evaluation results of each sample of Experiment 4 are shown in Table 9. Note that, Table 9 includes the experiment results of the soft magnetic alloy powders (Sample No. 1 and 11 of Experiment 1) having the same alloy composition as Sample No. 110 and 111.

TABLE 9

| Sample No | Shape of soft magnetic alloy | Heat treatment condition: Holding Temp. ° C. | Holding time h | Oxygen concentration ppm | Gauge pressure kPa | Analysis result of surface structure: P concentrated area: Formation | P concentration degree (—) | Co concentrated area: Formation | Co concentration degree (—) | Saturation magnetic flux density Bs T | Immersion test Evaluation |
|---|---|---|---|---|---|---|---|---|---|---|---|
| 1※ | Powder | — | — | — | — | None | — | None | — | 1.69 | Standard |
| 11 | Powder | 200 | 1.0 | 100 | 0.30 | Formed | 2.41 | Formed | 2.01 | 1.71 | VG |
| 110※ | Ribbon | — | — | — | — | None | — | None | — | 1.69 | Standard |
| 111 | Ribbon | 200 | 1.0 | 100 | 0.30 | Formed | 2.47 | Formed | 2.09 | 1.72 | VG |

As shown in Table 9, when the soft magnetic alloy was a ribbon form, by forming the P concentrated area 11*a* and the Co concentrated area 11*b* by performing the predetermined heat treatment, the corrosion resistance can be improved while maintaining a high Bs.

NUMERICAL REFERENCES

1, 1*a*, 1*b* . . . Soft magnetic alloy
2 . . . Internal area
10 . . . Outermost surface
11 . . . Concentrated area
11*a* . . . P concentrated area
11*b* . . . Co concentrated area
12 . . . SB oxide area
13 . . . Fe Oxide layer
20 . . . Coating layer

What is claimed is:

1. A soft magnetic alloy comprising an internal area having a soft magnetic type alloy composition including Fe and P (phosphorous), and a P concentrated area existing closer to a surface side than the internal area and having a higher P concentration than in the internal area, wherein the internal area occupies at least 90 vol % of a volume of the soft magnetic alloy, an average thickness of the P concentrated area is 0.3 nm or more and 30 nm or less, the soft magnetic type alloy composition satisfies a compositional formula of $((Fe_{(1-(\alpha+\beta))}Co_{\alpha}Ni_{\beta})_{1-\gamma}X1_{\gamma})_{(1-(a+b+c+d+e))}B_aP_bSi_cC_dCr_e$, X1 is at least one selected from Ti, Zr, Hf, Nb, Ta, Mo, W, Al, Ga, Ag, Zn, S, Ca, Mg, V, Sn, As, Sb, Bi, N, O, Au, Cu, rare earth elements, and platinum group elements, $0 \le \alpha \le 0.700$, $0 \le \beta \le 0.200$, $0 \le \gamma \le 0.030$, $0.720 \le (1-(a+b+c+d+e)) \le 0.950$, $0 \le a \le 0.200$, $0.001 \le b \le 0.100$, $0 \le c \le 0.150$, $0 \le d \le 0.050$, and $0 \le e \le 0.050$.

2. The soft magnetic alloy according to claim 1, wherein 50 mol % or more of all elements included in the P concentrated area are common elements that are included in both the P concentrated area and the internal area.

3. The soft magnetic alloy according to claim 1, wherein the internal area includes Co, a concentrated area of Co exists closer to the surface side than the internal area, and the concentrated area of Co at least partially overlaps with the P concentrated area.

4. The soft magnetic alloy according to claim 3, wherein the concentrated area of Co comprises a metal phase.

5. The soft magnetic alloy according to claim 3, wherein a Co concentration degree in the concentrated area of Co is larger than 1.2.

6. The soft magnetic alloy according to claim 1, wherein a P concentration degree of the P concentrated area is 1.5 or more.

7. The soft magnetic alloy according to claim 1, wherein a P concentration degree of the P concentrated area is 2.0 or more.

8. The soft magnetic alloy according to claim 1 having an amorphous degree of 85% or more.

9. The soft magnetic alloy according to claim 1 being a ribbon form.

10. The soft magnetic alloy according to claim 1 being a powder form.

11. A magnetic component including a soft magnetic alloy according to claim 1.

* * * * *